United States Patent
Kuramoto et al.

(10) Patent No.: US 7,396,873 B2
(45) Date of Patent: Jul. 8, 2008

(54) ORGANOMETALLIC POLYMER MATERIAL AND PROCESS FOR PREPARING THE SAME

(75) Inventors: Keiichi Kuramoto, Osaka (JP); Youhei Nakagawa, Osaka (JP); Mitsuaki Matsumoto, Osaka (JP); Nobuhiko Hayashi, Osaka (JP); Hitoshi Hirano, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 282 days.

(21) Appl. No.: 10/952,497

(22) Filed: Sep. 29, 2004

(65) Prior Publication Data

US 2005/0106400 A1 May 19, 2005

(30) Foreign Application Priority Data

Sep. 29, 2003 (JP) ............... JP 2003-338553
Mar. 18, 2004 (JP) ............... JP 2004-078015

(51) Int. Cl.
*C08L 83/04* (2006.01)
(52) U.S. Cl. ............... 524/588; 524/284; 528/34; 528/32
(58) Field of Classification Search ............ 528/34, 528/32; 524/588, 284
See application file for complete search history.

(56) References Cited

U.S. PATENT DOCUMENTS

| 4,906,686 | A | * | 3/1990 | Suzuki et al. | 524/730 |
| RE35,474 | E | * | 3/1997 | Woodard et al. | 424/448 |
| 6,025,435 | A | * | 2/2000 | Yamakawa et al. | 524/862 |
| 6,144,795 | A | * | 11/2000 | Dawes et al. | 385/141 |

FOREIGN PATENT DOCUMENTS

| JP | 6-322136 | 11/1994 |
| JP | 2000-34413 | 2/2000 |
| JP | 2000-336281 | 12/2000 |
| JP | 2000-356722 | 12/2000 |
| JP | 2001-506372 | 5/2001 |
| JP | 2003-195070 | 7/2003 |
| WO | WO 98/28315 | 6/1998 |

* cited by examiner

*Primary Examiner*—Kuo-Liang Peng
(74) *Attorney, Agent, or Firm*—McDermott Will & Emery LLP

(57) ABSTRACT

An organometallic polymer material having a -M-O-M- bond (M is a metal atom) and containing a metal alkoxide having only one hydrolyzable group and/or a hydrolysate of the metal alkoxide and preferably further containing an organic acid anhydride and/or an organic acid.

21 Claims, 18 Drawing Sheets

(a)

(b)

(a)

(b)

(c)

(a)

(b)

(c)

(a)

(b)

(c)

(a)

(b)

(c)

(d)

(e)

(f)

(g)

(a)

(b)

(a)

(b)

46   47   48   49

(a)

(b)

ORGANOMETALLIC POLYMER MATERIAL AND PROCESS FOR PREPARING THE SAME

The priority Japanese Patent Application Numbers 2003-338553 and 2004-78015 upon which this patent application is based is hereby incorporated by reference.

BACKGROUND OF THE INVENTION

1. Field of the Invention

The present invention relates to an organometallic polymer material which can be used in various coating materials such as an electric wiring substrate, a surface protecting film, and an anti-reflection film, optical communication devices such as an optical transmission and reception module, an optical switch, and an optical modulator, optical propagation path structures such as optical waveguide, an optical fiber, and a lens array, optical devices such as an optical beam splitter, and optical devices such as a lens, a microlens array, and a light guiding plate, and a process for preparing the same.

2. Explanation of the Related Art

Inorganic materials such as metals and ceramics are excellent in heat resistance, mechanical strength, electrical property, optical property, and chemical stability, and are industrially widely used utilizing their functions. However, inorganic materials are generally fragile and are high in a hardness and, in order to process into a desired shape, molding at a high temperature and mechanical processing become necessary, and their utility is restricted in some cases.

On the other hand, since organic polymers are excellent in moldability, and have flexibility, processibility is better. However, in heat resistance and chemical stability, organic polymers are inferior as compared with inorganic materials in many cases. Then, in recent years, organic polymers prepared from metal alkoxide as a starting material, called organic inorganic hybrid material or organic inorganic nanocomposite, are intensively developed.

In JP-A No. 2000-356722 and JP-A No. 2001-506372, an attempt to apply such an organic inorganic hybrid material to an optical waveguide was tried.

However, in any case, since a hydrolyzing reaction is performed using metal alkoxide as a starting material by adding water as a material as necessary by a process called the sol-gel method, water ($H_2O$) and a silanol group (Si—OH) remain in a large amount in a material. In particular, since a silanol group is difficult to remove by heat or the like, it becomes a great cause for light loss mainly in an infrared region, and has great influence, particularly near 1500 nm which is an optical communication wavelength band.

SUMMARY OF THE INVENTION

An object of the present invention is to provide an organometallic polymer material having high heat resistance and having excellent transparency and a process for preparing the same.

An organometallic polymer material in accordance with a first aspect of the present invention is characterized in that a metal alkoxide having only one hydrolyzable group and/or a hydrolysate thereof is (are) contained in an organometallic polymer having a -M-O-M-bond (M is a metal atom).

The metal alkoxide and/or a hydrolysate thereof may be contained in the state where it is not bound with an organometallic polymer, or in the state where it is bound with an organometallic polymer.

Alternatively, a hydrolysate of metal alkoxide may be a polycondensate of a hydrolysate.

In the present invention, since metal alkoxide having only one hydrolyzable group and/or a hydrolysate thereof is contained, metal alkoxide and/or a hydrolysate thereof is (are) reacted with a —OH group generated at an end of an organometallic polymer molecule, and a —OH group can be vanished. For this reason, optical propagation loss produced in a wavelength range of 1450 to 1550 nm can be reduced.

For example, when a metal atom M is Si, an alkoxy group represented by —Si—O—R is present at an end of an organometallic polymer molecule in some cases. This alkoxy group absorbs a moisture, is hydrolyzed, and produces a silanol group as follows:

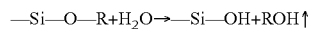

ROH produced in the above reaction is volatilized. When the silanol group is present, optical propagation loss near 1500 nm becomes great as described above.

In accordance with the present invention, when metal alkoxide having only one hydrolyzable group and/or a hydrolysate thereof is contained, a silanol group generated as described above can be vanished. For example, alkoxysilane having only one alkoxy group represented by the following formula absorbs moisture, and is hydrolyzed as follows:

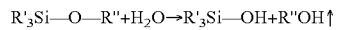

In the above reaction, R"OH is volatilized. A hydrolysate produced as described above is reacted with a silanol group at an end of an organometallic polymer as follows:

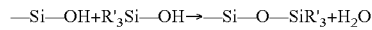

By the above reaction, a silanol group at an end of an organometallic polymer molecule is vanished. For this reason, according to the present invention, optical propagation loss near a wavelength 1500 nm can be reduced.

Since metal alkoxide is hydrolyzed, and acts as a hydrolysate as described above, it may be contained in a form of metal alkoxide, or may be contained in a form of a hydrolysate. In addition, when organometallic alkoxide or a hydrolysate thereof is contained in the state where it is not bound with an organometallic polymer, if it newly absorbs a moisture in an organometallic polymer, and a silanol group or the like is generated at its end, metal alkoxide or a hydrolysate thereof in the unbound state acts on this silanol group or the like, and this can vanish a silanol group or the like as described above.

In the present invention, the metal alkoxide or a hydrolysate thereof may contain a fluorine atom. That is, it is metal alkoxide or a hydrolysate thereof in which hydrogen at a hydrocarbon part is substituted with a fluorine atom. By inclusion of a fluorine atom, optical loss in a long wavelength region can be further reduced.

An organometallic polymer material in accordance with a second aspect of the present invention is characterized in that an organic acid anhydride and/or an organic acid is (are) contained in an organometallic polymer having a -M-O-M-bond (M is a metal atom).

Since an organic acid anhydride absorbs a moisture and is hydrolyzed, when an organic acid anhydride is contained, a moisture in an organometallic polymer can be reduced. Thereby, absorption due to a moisture is reduced and, by adding only an organic acid anhydride, optical propagation loss in a wavelength range of 1300 to 1350 nm and 1450 to 1550 nm can be reduced. In addition, an organic acid contained in an organometallic polymer promotes a reaction of a silanol group or the like. For this reason, the acid promotes loss of a silanol group or the like. For example, the acid can also promote a reaction between silanol groups at an end of an organometallic polymer molecule.

It is preferable that an organic acid anhydride and/or an organic acid is (are) contained also in an organometallic polymer in the first aspect of the present invention. That is, when an organic acid anhydride and/or an organic acid is (are) contained together with metal alkoxide having only one hydrolyzable group and/or a hydrolysate thereof, in addition to removal of moisture by an organic acid anhydride, a hydrolysate of metal alkoxide having only one hydrolyzable group reacts with an —OH group generated at an end of an organometallic polymer molecule, and a reaction of vanishing an —OH group is promoted, and optical propagation loss at a wavelength range of 1450 to 1550 nm can be further reduced.

In JP-A No. 6-322136 and JP-A No. 2003-195070, trifluoroacetic acid is used as a catalyst for the purpose of promoting a reaction of hydrolyzing a hydrolyzable silane compound. This is added in order to make a reaction solution acidic during a sol gel process for proceeding a reaction by adding water, and is not trifluoroacetic anhydride. The reason is that trifluoroacetic anhydride is vigorously reacted with water, and is immediately changed into trifluoroacetic acid. In addition, addition to a final product (cured product), and effect of reducing optical loss by acid anhydride as in the present invention are not disclosed at all.

In addition, when trifluoroacetic anhydride or trifluoroacetic acid is added, an addition amount thereof is preferably at a level which can be detected by infrared absorption spectrometry. Specifically, it is preferable that a ratio of a height of an absorption peak of trifluoroacetic acid (around 1780 $cm^{-1}$)/a height of an absorption peak derived from SiO (around 1100 $cm^{-1}$) is 0.05 or higher.

When the metal alkoxide or a hydrolysate thereof is alkoxysilane or a hydrolysate thereof, one example is represented by the following general formula:

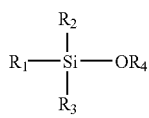

(wherein $R_1$, $R_2$ and $R_3$ are an organic group having a carbon number of 1 to 15, preferably an alkyl group, and $R_4$ is an alkyl group having a carbon number of 1 to 4).

Specific examples include trialkylalkoxysilane such as trimethylalkoxysilane and triethylalkoxysilane. Examples of an alkoxy group include a methoxy group and an ethoxy group.

Examples of the organic acid anhydride include trifluoroacetic anhydride, acetic anhydride, and propionic anhydride. Particularly preferably, trifluoroacetic anhydride is used. Examples of the organic acid include trifluoroacetic acid, acetic acid, and propionic acid. Particularly preferably, trifluoroacetic acid is used.

In the present invention, an organometallic polymer can be synthesized, for example, by hydrolysis and a polycondensation reaction of an organometallic compound having at least two hydrolyzable groups. Examples of such the organometallic compound include trialkoxysilane and dialkoxysilane having an organic group. Examples of the organic group include an alkyl group, an aryl group, and an aryl-containing group. As the aryl group, a phenyl group is preferable. Further preferable examples include phenyltrialkoxysilane, and diphenyldialkoxysilane, and more preferable examples include phenyltriethoxysilane, phenyltrimethoxysilane, diphenyldimethoxysilane, and diphenyldiethoxysilane.

In addition, it is preferable that, as the organometallic compound, an organometallic compound having a functional group which is crosslinked by heat and/or energy-ray irradiation is contained. Examples of the energy-ray include an ultraviolet-ray, and an electron beam. Examples of such the functional group to be crosslinked include an acryloxy group, a methacryloxy group, a styryl group, an epoxy group, and a vinyl group. Therefore, trialkoxysilane having these functional groups is preferably used.

When a radical polymerizable functional group such as an acryloxy group, a methacryloxy group, a styryl group, and a vinyl group is contained, it is preferable that a radical polymerization initiator is contained. Examples of the radical polymerization initiator include 1-hydroxy-cyclohexyl-phenyl-ketone, 2-hydroxy-2-methyl-1-phenyl-propane-1-one, 2-benzyl-2-dimethylamino-1-(4-morpholinophenyl)-butanone-1, oxy-phenyl-acetic acid 2-(2-oxo-2-phenyl-acetoxy-ethoxy)-ethyl-ester, and oxy-phenyl-acetic acid 2-(2-hydroxy-ethoxy)-ethyl-ester, and a mixture thereof.

In addition, when an organometallic compound having an epoxy group is contained, it is preferable that a curing agent is contained. Examples of such the curing agent include an amine curing agent, an imidazole curing agent, a phosphorus curing agent, and an acid anhydride curing agent. Specific examples include methylhexahydrophthalic anhydride, hexahydrophthalic anhydride, and tetraethylenepentamine.

When an organometallic compound having a functional group, and an organometallic compound having no functional group are used by mixing them, it is preferable that a mixing ratio as a ratio by weight (organometallic compound having functional group:organometallic compound having no functional group) is 5 to 95:95 to 5.

A content of the metal alkoxide or a hydrolysate thereof is preferably 0.1 to 15 parts by weight, further preferably 0.2 to 2.0 parts by weight relative to 100 parts by weight of an organometallic polymer.

In addition, a content of an organic acid anhydride or an organic acid is preferably 0.1 to 10 parts by weight, further preferably 1 to 5 parts by weight relative to 100 parts by weight of an organometallic polymer.

In the present invention, the aforementioned metal alkoxide and hydrolysate thereof, as well as organic acid anhydride and organic acid may be added during a process of synthesizing a precursor (liquid) before curing an organometallic polymer, or may be added immediately before curing of a precursor. Alternatively, they may be added by a method of wetting in an organometallic polymer after curing.

In the present invention, M in a -M-O-M-bond in an organometallic polymer is preferably Si, Ti, Nb or Zr or a combination of these metals, particularly preferably Si. In the case of Si, an organometallic polymer can be formed, for example, from a silicone resin. Alternatively, it may be synthesized by hydrolysis of at least one kind alkoxysilane and a polycondensation reaction. In this case, at least one kind of alkoxysilane may be trialkoxysilane having an acryloxy group, a methacryloxy group, a styryl group, a vinyl group or an epoxy group.

In the present invention, at least one kind of a particle composed of a material having a different refractive index from that of an organometallic polymer may be contained in an organimetallic polymer. By inclusion of such the particle, a reflective index of an organometallic polymer material can be controlled. A size of a particle is preferably in a range of 5 nm to 1 µm. In particular, when used as an optical material, the size is preferably 10 nm to 20 nm in order to decrease light scattering.

As the particle, a particle composed of an inorganic material and a particle composed of an organic material may be used, and a metal oxide particle is particularly preferably used. Examples of the metal oxide particle include silicon oxide, niobium oxide, zirconium oxide, titanium oxide, aluminum oxide, yttrium oxide, cerium oxide, and lanthanum oxide. Among them, in particular, silicon oxide, niobium oxide, zirconium oxide and titanium oxide are preferably used.

In addition, when a metal atom M in an organometallic polymer is Si, it is preferable that an amount of a silanol group (Si—OH) in an organometallic polymer is adjusted so that a ratio of (height of absorption peak of Si—OH bond near 3400 $cm^{-1}$)/(height of absorption peak of C—H bond near 2900 $cm^{-1}$) in an infrared absorption spectrum becomes 0.2 or smaller. By adopting this peak ratio of 0.2 or smaller, light propagation loss at a wavelength 500 to 1100 nm, 1300 to 1350 nm, or 1450 to 1550 nm can be 1.5 dB/cm or smaller.

In the present invention, a boiling point of the metal alkoxide or a hydrolysate is preferably a thermal curing temperature of an organometllic polymer or lower. Thereby, metal alkoxide or a hydrolysate thereof excessively contained in an organometallic polymer can be volatilized and removed by heating.

In addition, a boiling point of the organic acid anhydride or organic acid is also preferably a thermal curing temperature of the organic metal polymer or lower. Thereby, an excessive organic acid anhydride or organic acid may be volatilized and removed by heating.

In the organometallic polymer material of the present invention, it is preferable that light propagation loss in a range of each of a wavelength 500 to 1100 nm, 1300 to 1350 nm or 1450 to 1550 nm is 1.5 dB/cm or lower.

The organometallic polymer material of the present invention may further contain an organic polymer as an additive. Examples of the organic polymer include acrylate resins, epoxy resins, urethane resins, urethane acrylate resins, polyester acrylate resins, and epoxy acrylate resins. An amount of the organic polymer to be added is in a range of preferably 5 to 95% by weight, further preferably 20 to 60% by weight.

The preparation process of the present invention is a process which can prepare the aforementioned organometallic polymer material of the present invention, and is characterized in that it comprises a step of hydrolyzing and poylcondensing a mixture of a first organometallic compound having at least two hydrolyzable groups, and a second organometallic compound having a functional group which is crosslinked by heating and/or energy-ray irradiation, and two hydrolyzable groups, a step of adding metal alkoxide having only one hydrolyzable group and/or a hydrolysate thereof to this polycondensate, and a step of heating the polycondensate after addition or irradiating the polycondensate with an energy-ray to cause a crosslinking reaction by a functional group to cure the polycondensate.

A preferable aspect in the preparation process of the invention is characterized in that an organic acid anhydride and/or an organic acid together with metal alkoxide and/or a hydrolysate thereof is (are) added to the polycondensate.

A preparation process in accordance with another aspect of the present invention is characterized in that it comprises a step of hydrolyzing and polycondensing a mixture of a first organometallic compound having at least two hydrolyzable groups, and a second organometallic compound having a functional group which is crosslinked by heating and/or energy-ray irradiation, and at least two hydrolyzable groups, a step of adding an organic acid anhydride and/or an organic acid to the polycondensate, and a step of heating the polycondensate after addition or irradiating the polycondensate with an energy-ray to cause a crosslinking reaction by a functional group, to cure the polycondensate.

An optical device of the present invention is characterized in that it is formed using the aforementioned organometallic polymer material of the present invention, or an organometallic polymer material prepared by the aforementioned process of the present invention.

An adhesive composition of the present invention is characterized in that it comprises the aforementioned organometallic polymer material of the present invention, or an organometallic polymer material prepared by the process of the present invention.

By adhering plural optical devices using an adhesive composition of the present invention, an optical device can be prepared.

A laminated structure of the present invention is a laminated structure formed on a substrate using the organometallic polymer material of the present invention or an organometallic polymer material prepared by the process of the present invention, and is characterized in that an amount of an OH group bound to a metal atom M is larger on a substrate side, and smaller on a surface side of the laminated structure.

Like this, by adopting a larger amount of an OH group on a substrate side and a smaller amount of an OH group on a surface side of a laminated structure, adherability with a substrate can be improved. For example, when a metal atom M is Si, such a structure is adopted that an amount of a Si—OH group is larger on a substrate side, and is smaller on a surface side.

By forming a gradient structure regarding an amount of an OH group in a laminated structure, a structure better in adherability with a substrate can be formed without deteriorating physical property of a surface of a laminated structure. For example, as an amount of an OH group is smaller, physical property such as heat resistance is excellent. And, in the laminated structure of the present invention, since an amount of an OH group on a surface side can be reduced, a structure excellent in physical property such as heat resistance can be obtained. In addition, as an amount of an OH group is smaller, light loss can be reduced. And, in the laminated structure of the present invention, since an amount of an OH group on a surface side can be reduced, a member such as an optical device having little light loss can be formed.

As a method of improving adherability between an organic polymer and a substrate, JP-A No. 2000-336281 and JP-A No. 2000-34413 disclose a method of changing a component ratio of an organic component and an inorganic component. However, in such the method, physical property is considerably different between on a substrate side and on a surface side and, for example, a problem such as reduction in heat resistance arises in a region containing a larger amount of an organic component.

Since the organometallic polymer material of the present invention comprises an organometallic polymer having a -M-O-M-bond, it has high heat resistance. In addition, since the organometallic polymer material contains metal alkoxide having only one hydrolyzable group and/or a hydrolysate thereof, a silanol group and the like present at an end of an organometallic polymer molecule can be vanished, and light propagation loss in a range of a wavelength of 1450 to 1550 nm can be reduced. For this reason, the organometallic polymer material has excellent transparency.

Since the organometallic polymer material of the present invention has high heat resistance, and excellent transparency and, further, characteristic of being flexible, it is a material useful in molded materials, such a various coating materials such as an electric wiring substrate, a machine part material, an antireflection film, and a surface protecting film, optical communication devices such as an optical transmission and reception module, an optical switch, and an optical modifier, light propagation path structures such as a light waveguide, an optical fiber, and lens array as well as optical devices containing them such as an optical beam splitter, display device (display or liquid crystal projector)-associate optical elements such as an integrator lens, a microlens array, a reflecting plate, a light guiding plate, and a projection screen, spectacles, CCD optical system, a lens, a composite-type non-spherical lens, 2P (Photoreplication Process) lens, an optical filter, a diffraction lattice, an interferometer, a light coupler, a light combining and dividing equipment, an optical sensor, a hologram optical element, other optical device materials, a photoelectromotive element, a contact lens, a medical artificial tissue, and light emitting diode (LED).

DETAILED DESCRIPTION OF THE PREFERRED EXAMPLES

Figure 1:
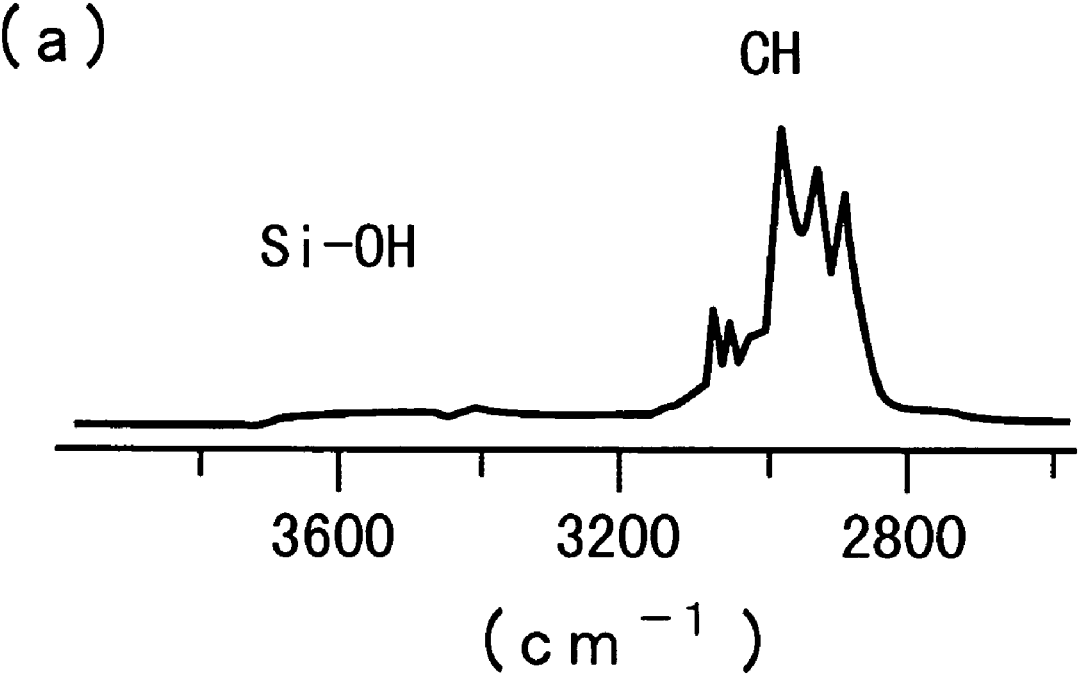
FIG. 1 is a view showing an infrared absorption analysis chart in Example of the present invention.
Figure 1:
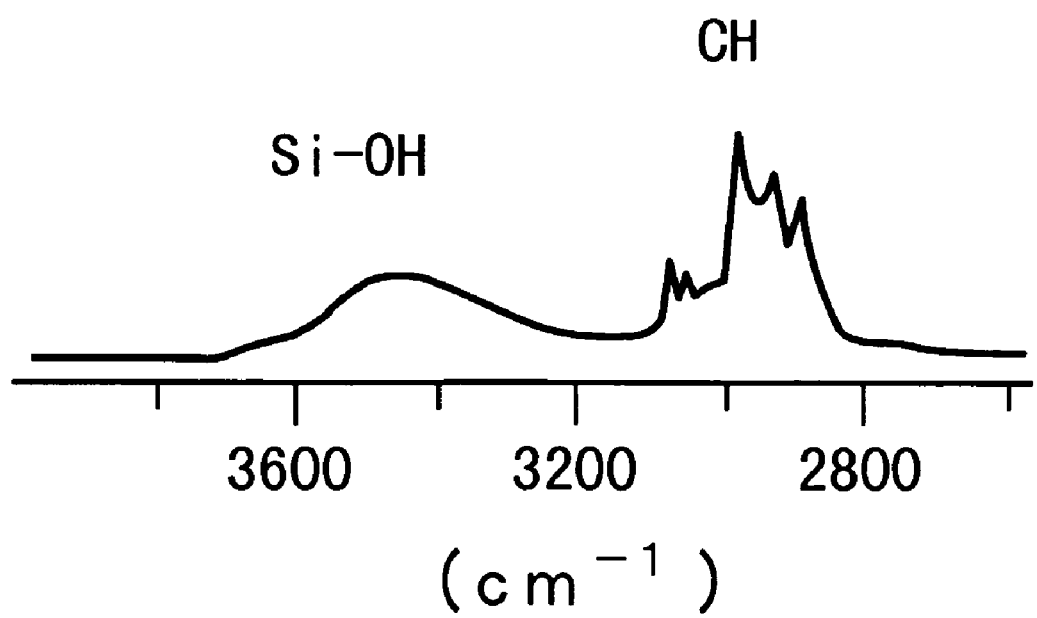

The present invention will be explained in detail by way of Examples, but the present invention is not limited by the following Examples.

Examples 1 to 15 and Comparative Examples 1 to 2

In the following respective Examples and respective Comparative Examples, synthesis of a material is performed by the following step P or step Q.

<Step P>

(1)

Organometallic compound A shown in Table 1: 5.5 ml (5.4 g in the case of Example 1).

Organometallic compound B shown in Table 1: 5.8 ml (6.2 g in the case of Example 1).

Aqueous solution containing hydrochloric acid as a reaction catalyst (hydrochloric acid of concentration 2N: 1.65 ml).

Ethanol: 20.5 ml

After the aforementioned compounds were mixed, the mixture was allowed to stand for 24 hours to hydrolyze an organometallic compound A and an organometallic compound B, followed by polycondensation.

(2)

4 ml of a solution of the resulting polycondensate was taken into a laboratory dish, 10 mg of 1-hydroxy-cyclohexyl-phenyl-ketone as a polymerization initiator was dissolved, and this was heated at 100° C. to evaporate and remove ethanol, to obtain about 1 g of a viscous liquid A.

Into 1 g of a viscous liquid A were mixed:

metal alkoxide X shown in Table 1: 3 ml (2.3 g in the case of Example 1), and organic acid Y shown in Table 1: 0.8 ml (1.2 g in the case of Example 1), the mixture was allowed to stand for 24 hours, heated and dried at 100° C. to evaporate and remove excessive metal alkoxide X and an organic acid Y, to obtain a viscous liquid B.

(3)

A viscous liquid B was irradiated with an ultraviolet-ray (wavelength 365 nm) to cure and solidify it.

<Step Q>

(1)

Organometallic compound A shown in Table 1: 5.5 ml (5.4 g in the case of Example 4), organometallic compound B shown in Table 1: 5.8 ml (6.2 g in the case of Example 4), an aqueous solution containing hydrochloric acid as a reaction catalyst (hydrochloric acid having a concentration of 2N): 1.65 ml, and ethanol: 20.5 ml were mixed, and allowed to stand for 24 hours to hydrolyze an organometallic compound A and an organometallic compound B, and polycondensate them.

(2)

4 ml of a solution of the resulting polycondensate was taken into a laboratory dish, 10 mg of 1-hydroxy-cyclohexyl-phenyl-ketone as a polymerization initiator was dissolved, and this was heated at 100° C. to evaporate and remove ethanol, to obtain about 1 g of a viscous liquid A.

(3)

Into 1 g of a viscous liquid A were mixed:

metal alkoxide X shown in Table 1: 0.02 ml (15 mg in the case of Example 4), and organic acid shown in Table 1: 0.01 ml (15 mg in the case of Example 4), and the mixture was stirred to obtain a viscous liquid C.

(4)

A viscous liquid C was irradiated with an ultraviolet-ray (wavelength 365 nm) to cure and solidify it.

Raw materials used in respective Examples and respective Comparative Examples will be explained below.

Example 1

3-Methacryloxypropyltriethoxysilane was used as an organometallic compound A, phenyltrimethoxysilane was used as an organometallic compound B, trimethylethoxysilane was used as metal alkoxide, and trifluoroacetic anhydride was used as an organic acid Y.

Example 2

The same procedure as that of Example 1 was performed except that trifluoroacetic acid was used as an organic acid Y.

Example 3

The same procedure as that of Example 1 was performed except that metal alkoxide X was not used.

Example 4

According to the same manner as that of Example 1 except that synthesis was performed by a step Q, preparation was conducted.

Example 5

According to the same manner as that of Example 4 except that an amount of metal alkoxide X and an amount of an organic acid Y were ⅓ of an amount of Example 4, preparation was performed.

Example 6

The same procedure as that of Example 1 was performed except that trifluoropropyltrimethoxysilane was used as an organometallic compound B.

Example 7

The same procedure as that of Example 1 was performed except that an organic acid Y was not used.

Example 8

The same procedure as that of Example 1 was performed except that terminal-silanol type polydimethylsiloxane (OH [Si (CH$_3$)$_2$O]$_n$H) (n=average 2000) which is a raw material for a silicone resin was used as an organometallic compound B.

Example 9

The same procedure as that of Example 1 was performed except that 3-methacryloxypropyltrimethoxysilane was used as an organometallic compound A, and zirconium isopropoxide was used as an organometallic compound B.

Example 10

The same procedure as that of Example 1 was performed except that 3-acryloxypropyltrimethoxysilane was used as an organometallic compound A, and titanium isopropoxide was used as an organometallic compound B.

Comparative Example 1

The same procedure as that of Example 1 was performed except that metal alkoxide X and an organic acid Y were not used.

Comparative Example 2

The same procedure as that of Comparative Example 1 was performed except that terminal-silanol type polydimethylsiloxane was used as an organometallic compound B.

Examples 11 to 15

Organometallic compounds A and B, metal alkoxide X, and an organic acid Y, shown in Table 2, were used to synthesize a viscous liquid B, and this was irradiated with an ultraviolet-ray to cure it.

(Assessment of Light Propagation Loss)

The aforementioned viscous liquid B or C was added dropwise to a quartz glass substrate having a thickness of 1 mm, and this was irradiated with an ultraviolet-ray (wavelength 365 nm) to cure to obtain a sample. Two kinds of samples were prepared, a thickness of a sample was 70 μm and 300 μm, respectively. Using these samples, a transmittance was obtained with a photospectrometer, and light propagation loss (dB/cm) in a range of a wavelength 500 to 1100 nm, 1300 to 1350 nm, or 1450 to 1550 nm was determined from the transmittance. The results are shown in Table 1 and Table 2.

Figure 2:
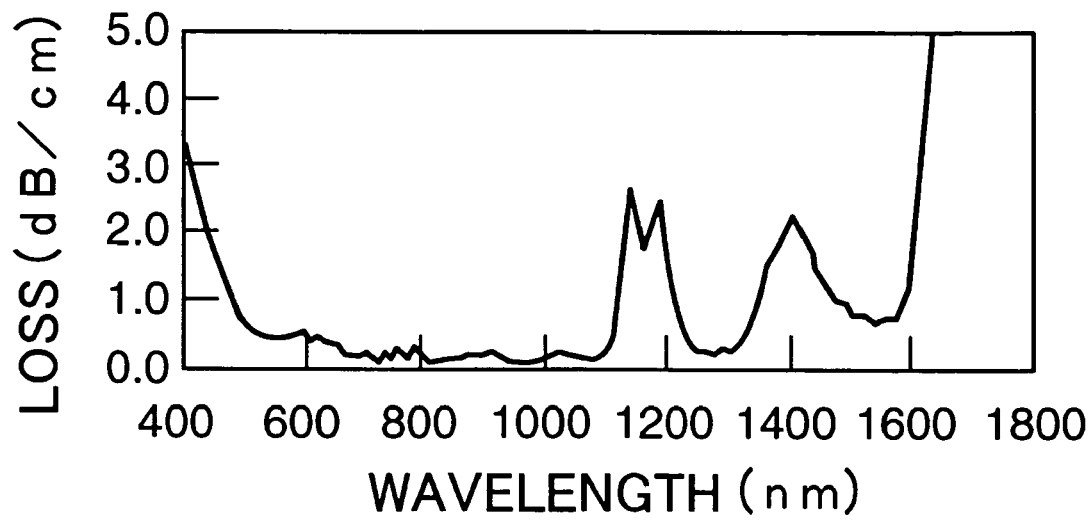
FIG. 2 is a view showing a relationship between a wavelength and light propagation loss in Example of the present invention.
Figure 3:
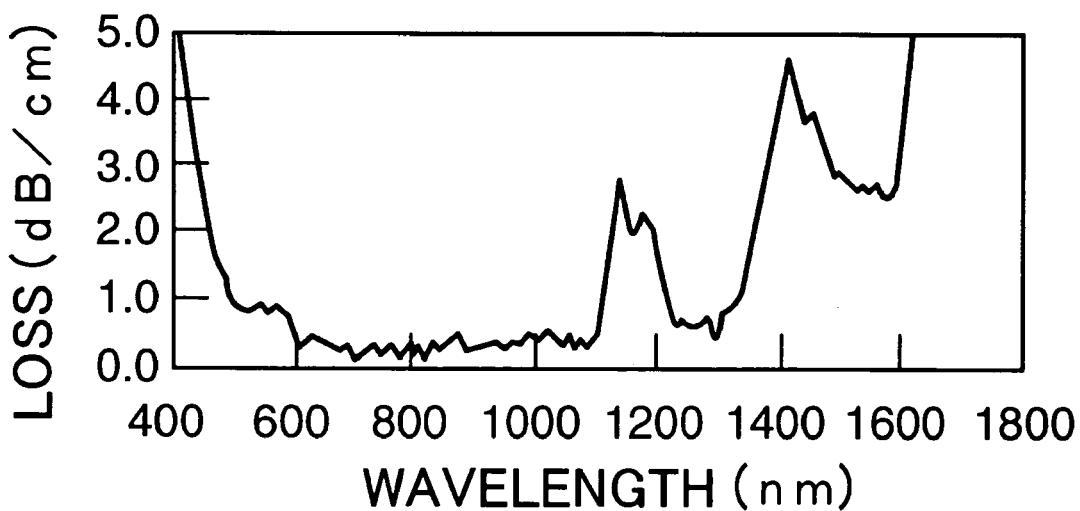
FIG. 3 is a view showing a relationship between a wavelength and light propagation loss in Comparative Example.

In addition, a relationship between a wavelength and light propagation loss in a sample of Example 1 is shown in FIG. 2. A relationship in Comparative Example 1 is shown in FIG. 3.

(Infrared Absorption Spectrometric Analysis)

Figure 13:
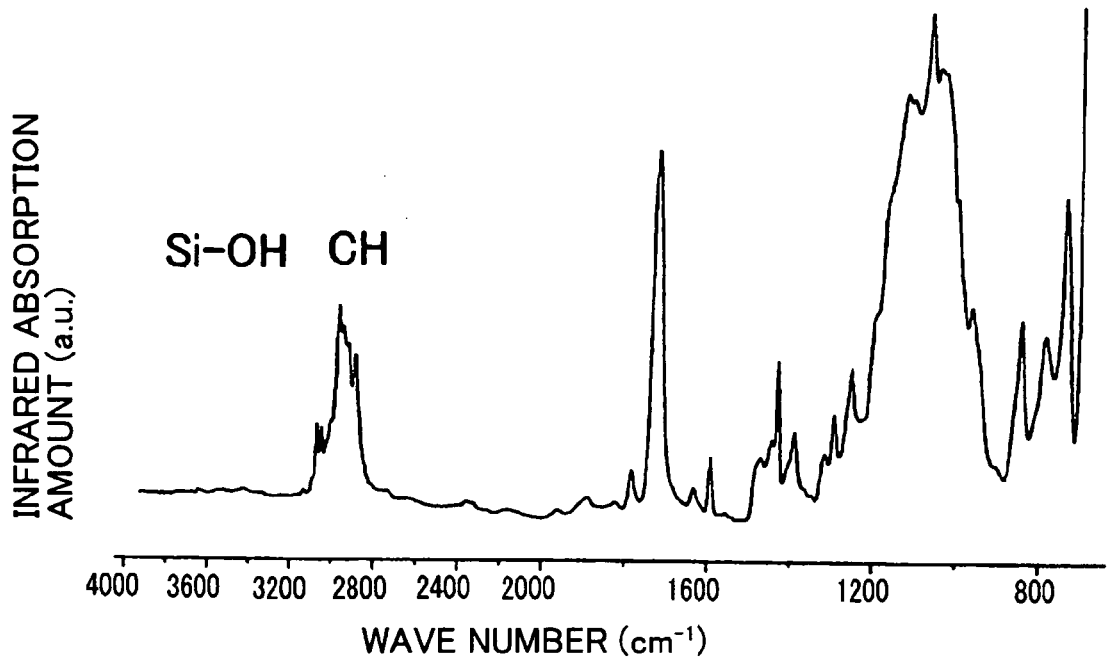
FIG. 13 is a view showing an infrared absorption analysis chart of a cured organometallic polymer material in Example 1 of the present invention.
Figure 13:
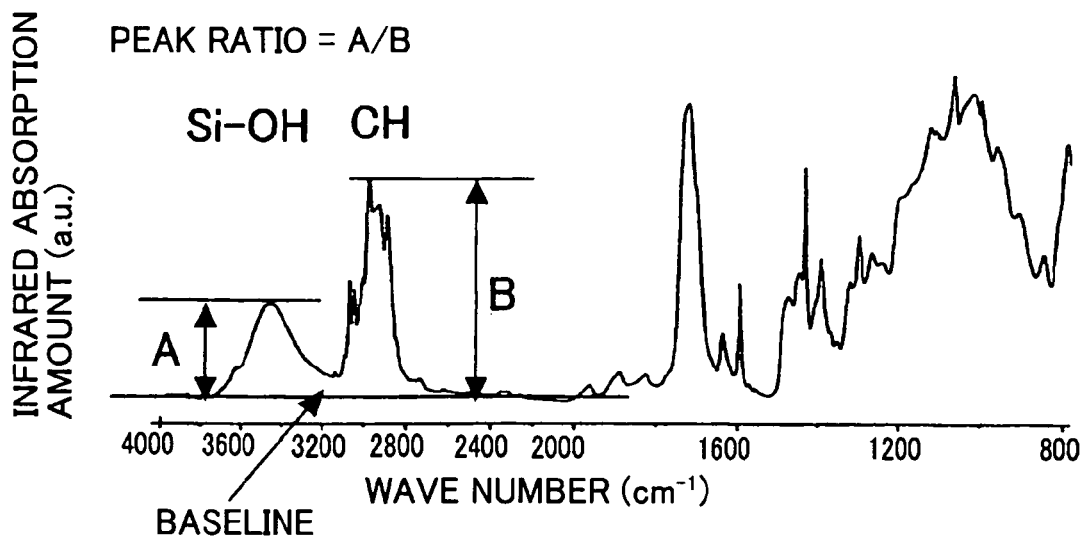
Figure 14:
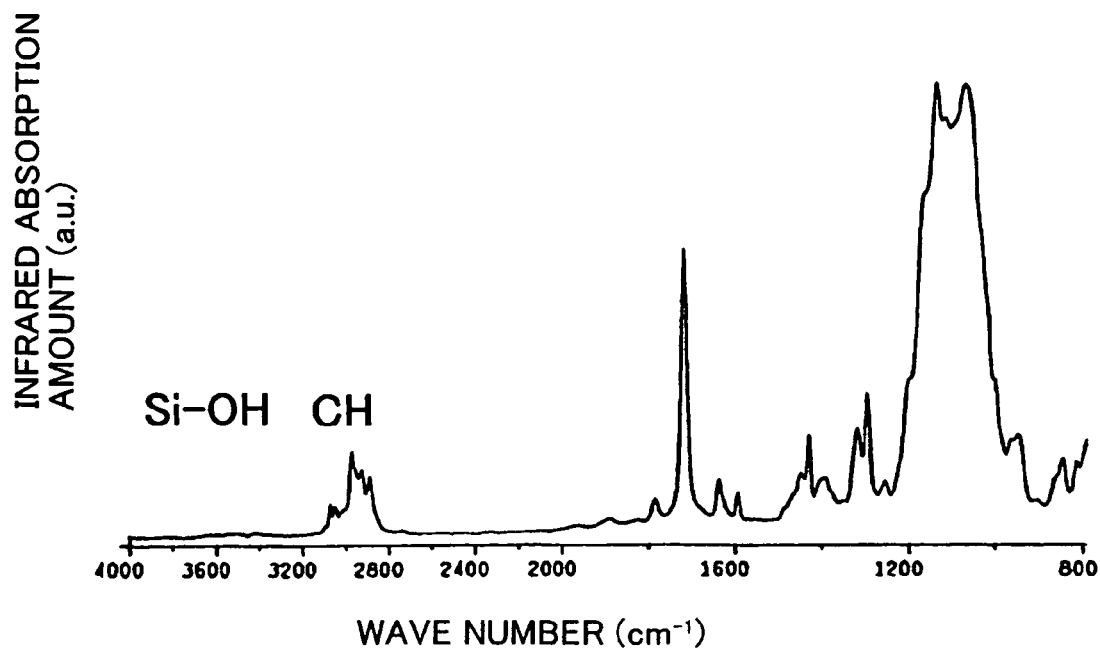
FIG. 14 is a view showing an infrared absorption analysis chart of a viscous liquid before curing of an organometallic polymer material in Example 1 of the present invention.
Figure 14:
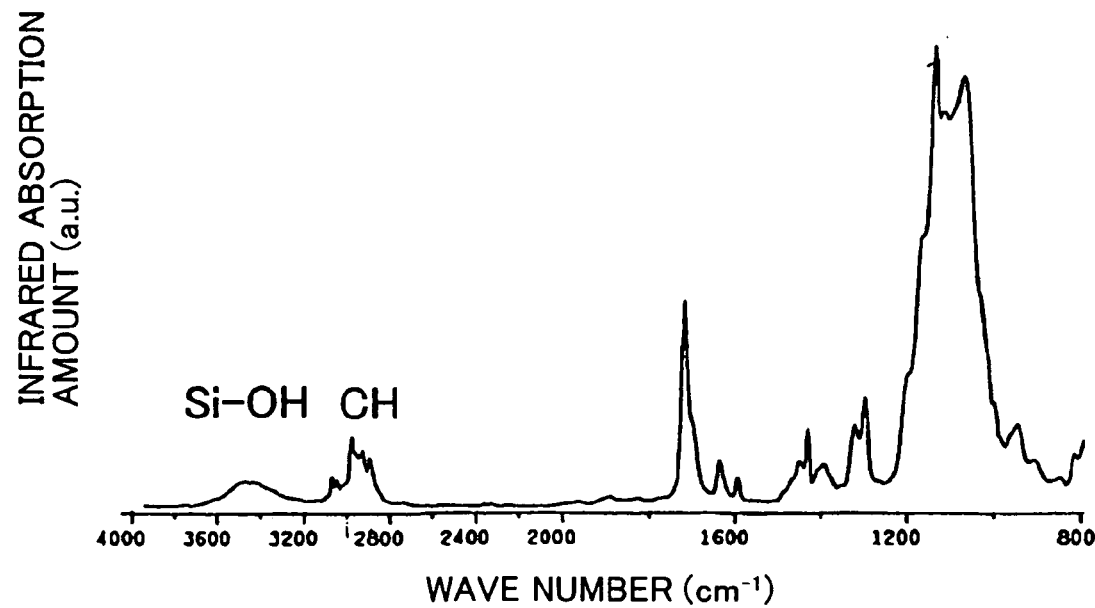

Using the aforementioned each sample, infrared absorption spectrometric (IR) analysis was conducted. FIG. 1(a) and FIG. 1(b) and FIG. 13(b) show Comparative Example 1. FIG. 13(a) and FIG. 13(b) show IR spectrum at a wavelength range of 800 to 4000 cm$^{-1}$. FIG. 14(a) and FIG. 14(b) show IR spectrum of a precursor (liquid) before irradiation of Example 1 and Comparative Example 1. As apparent from comparison of FIG. 1(a) and FIG. 13(a) with FIG. 1(b) and FIG. 13(b), it is seen that, in a sample of Example 1 in accordance with the present invention, a peak of a silanol group (SiOH group) around 3400 cm$^{-1}$ disappeared. This is thought as follows: By inclusion of metal alkoxide X, this and a silanol group in an organometallic polymer are reacted to vanish a silanol group.

In addition, a value of a ratio of a height of an absorption peak of trifluoroacetic acid (around 1780 cm$^{-1}$)/a height of an absorption peak resulting from Si—O (around 1100 cm$^{-1}$) in infrared absorption spectrometry is shown in Table 1 and Table 2.

In a cured organometallic polymer material of the present invention, when a metal atom M is Si, as described above, it is preferable that a silanol group (Si—OH) is contained so that a ratio of (height of absorption peak of Si—OH bond at around 3400 cm$^{-1}$)/(height of absorption peak of C—H bond at around 2900 cm$^{-1}$) is 0.2 or smaller in an IR spectrum. By adopting this peak ratio of 0.2 or smaller, each light propagation loss at a wavelength 500 to 1100 nm, 1300 to 1350 nm, and 1450 to 1550 nm can be 1.5 dB/cm or smaller. Peak ratios of the IR spectrum in Examples 1, 5 and 7 as well as Comparative Example 1 are shown below:

Example 1: 0.08
Example 5: 0.2
Example 7: 0.12
Comparative Example 1: 0.42

(Measurement of Amount of Remaining Alkoxide Hydrolysate)

An amount of trimethylsilanol in a cured organometallic polymer was measured. Specifically, trimethylsilanol in a solid material was extracted with a solvent, and the extract was measured by gas chromatography. The results of measurement are shown in Table 1 and Table 2.

(Analysis of Reaction Product)

In a solid material prepared by using trimethylethoxysilane and trifluoroacetic acid, analysis of the produced compounds was further conducted in more detail. Specifically, analysis was performed using a thermal extraction gas chromatography mass spectrometry device. In this device, a substance which is eliminated by heating a sample is introduced into mass separation gas chromatography to perform analysis. As a result of analysis, ester ($CF_3COOC_2H_5$) derived from trifluoroacetic acid was detected from a sample using trifluoroacetic acid, hexamethyldisiloxane (($CH_3)_3SiOSi(CH_3)_3$) which is a hydrolysis polycondensate of trimethylethoxysilane was detected from a sample using trimethylethoxysilane, and both compounds were detected from a sample using both of trifluoroacetic acid and trimethylethoxysilane. By detecting these substances, it can be confirmed that trifluoroacetic acid and trimethylethoxysilane were added in a material synthesizing step or the like.

(Measurement of Maintenance Rate of Transmittance)

Using the aforementioned sample, change in a transmittance at 1550 nm with time was assessed. Specifically, a transmittances before allowing to stand and after allowing to stand when allowed to stand at room temperature for 1000 hours were measured, and (transmittance after allowing to stand)/(transmittance before allowing to stand)×100 is shown as a maintenance rate of a transmittance in Table 1 and Table 2.

TABLE 1

| | | Synthesis Step | Organometallic Compound A | Organometallic Compound B | Metal Alkoxide X | Organic Acid Y |
|---|---|---|---|---|---|---|
| Ex. | 1 | P | 3-Methacryloxypropyltriethoxysilane | Phenyltrimethoxysilane | Trimethylethoxysilane | Trifluoroacetic Anhydride |
| | 2 | P | 3-Methacryloxypropyltriethoxysilane | Phenyltrimethoxysilane | Trimethylethoxysilane | Trifluoroacetic Acid |
| | 3 | P | 3-Methacryloxypropyltriethoxysilane | Phenyltrimethoxysilane | None | Trifluoroacetic Anhydride |
| | 4 | Q | 3-Methacryloxypropyltriethoxysilane | Phenyltrimethoxysilane | Trimethylethoxysilane | Trifluoroacetic Anhydride |
| | 5 | Q | 3-Methacryloxypropyltriethoxysilane | Phenyltrimethoxysilane | Trimethylethoxysilane (Amount of ⅓ Example 4) | Trifluoroacetic Anhydride (Amount of ⅓ Example 4) |
| | 6 | P | 3-Methacryloxypropyltriethoxysilane | Trifluoropropyltrimethoxysilane | Trimethylethoxysilane | Trifluoroacetic Anhydride |
| | 7 | P | 3-Methacryloxypropyltriethoxysilane | Phenyltrimethoxysilane | Trimethylethoxysilane | None |
| | 8 | P | 3-Methacryloxypropyltriethoxysilane | Terminalsilanol Type Polydimethylsiloxane | Trimethylethoxysilane | Trifluoroacetic Anhydride |
| | 9 | P | 3-Methacryloxypropyltriethoxysilane | Zirconium Isopropoxide | Trimethylethoxysilane | Trifluoroacetic Anhydride |
| | 10 | P | 3-Acryloxypropyltrimethoxysilane | Titanium Isopropoxide | Trimethylethoxysilane | Trifluoroacetic Anhydride |
| Comp. Ex. | 1 | P | 3-Methacryloxypropyltriethoxysilane | Phenyltrimethoxysilane | None | None |
| | 2 | P | 3-Methacryloxypropyltriethoxysilane | Terminalsilanol Type Polydimethylsiloxane | None | None |

TABLE 1-continued

|  |  | Light Propagation Loss (dB/cm) | | | Peak Intensity Ratio in IR Analysis (around 1780 cm⁻¹)/ | Amount of Remaining Alkoxide Hydrolysate | Maintenance Rate of |
| --- | --- | --- | --- | --- | --- | --- | --- |
|  |  | 500-1100 nm | 1300-1350 nm | 1450-1550 nm | (around 1100 cm⁻¹) | (% by weight) | Transmittance (%) |
| Ex. | 1 | 0.5 or Smaller | 0.5 or Smaller | 0.8 | 0.1 | 1 | 98 |
|  | 2 | 0.5 or Smaller | 0.5 or Smaller | 0.9 | 0.08 | 0.94 | 96 |
|  | 3 | 0.5 or Smaller | 0.5 or Smaller | 1.2 | 0.8 | 0 | 90 |
|  | 4 | 0.5 or Smaller | 0.5 or Smaller | 1.0 | 0.1 | 1.2 | 98 |
|  | 5 | 0.5 or Smaller | 1.5 Smaller | 0.03 | 0.2 | 95 |  |
|  | 6 | 0.5 or Smaller | 0.5 or Smaller | 0.7 | 0.05 | 0.9 | 97 |
|  | 7 | 0.5 or Smaller | 0.5 or Smaller | 1.2 | 0 | 0.97 | 93 |
|  | 8 | 0.5 or Smaller | 0.5 or Smaller | 0.8 | 0.1 | 1.1 | 98 |
|  | 9 | 1.0 | 0.7 | 1.0 | 0.2 | 0.86 | 95 |
|  | 10 | 1.0 | 0.9 | 1.0 | 0.2 | 1.05 | 94 |
| Comp. Ex. | 1 | 0.5 or Smaller | 0.7 | 2.6 | 0 | 0 | 86 |
|  | 2 | 0.5 or Smaller | 0.5 or Smaller | 1.8 | 0 | 0 | 88 |

TABLE 2

|  | Synthesis Step | Organometallic Compound A | Organometallic Compound B | Metal Alkoxide X | Organic Acid Y | Light Propagation Loss (dB/cm) | | | Peak Intensity Ratio in IR Analysis (around 1780 cm⁻¹)/ (around 1100 cm⁻¹) | Amount Of Remaining Alkoxide Hydrolysate (% by weight) | Maintenance Rate of Transmittance (%) |
| --- | --- | --- | --- | --- | --- | --- | --- | --- | --- | --- | --- |
|  |  |  |  |  |  | 500-1100 nm | 1300-1350 nm | 1450-1550 nm |  |  |  |
| Ex. 11 | P | P-styryltrimethoxysilane | Phenyltrimethoxysilane | Trimethylethoxysilane | Trifluoroacetic Anhydride | 0.5 or Smaller | 0.5 or Smaller | 0.9 | 0.1 | 1 | 98 |
| 12 | P | Vinyltriethoxysilane | Phenyltrimethoxysilane | Trimethylethoxysilane | Trifluoroacetic Anhydride | 0.5 or Smaller | 0.5 or Smaller | 0.9 | 0.1 | 0.95 | 98 |
| 13 | P | 3-Acryloxypropyltrimethoxysilane | Phenyltrimethoxysilane | Trimethylethoxysilane | Trifluoroacetic Anhydride | 0.5 or Smaller | 0.5 or Smaller | 0.8 | 0.1 | 1.1 | 98 |
| 14 | P | 3-Methacryloxypropyltriethoxysilane | Diphenyldimethoxysilane | Trimethylethoxysilane | Trifluoroacetic Anhydride | 0.5 or Smaller | 0.5 or Smaller | 0.8 | 0.1 | 1 | 98 |
| 15 | P | 3-Methacryloxypropyltriethoxysilane | Pentaethoxyniobium | Trimethylethoxysilane | Trifluoroacetic Anhydride | 1.0 | 0.8 | 1.1 | 0.2 | 1.1 | 94 |

As shown in Table 1 and Table 2, it is seen that, in Examples 1 to 15 in accordance with the present invention, light propagation loss in a wavelength region of 1450 to 1550 nm is reduced as compared with Comparative Examples 1 to 2. This is because a silanol group in an organometallic polymer is reduced by addition of metal alkoxide X and/or organic acid Y.

In addition, it is seen that there is a tendency that as an amount of remaining alkoxide is larger, a maintenance rate of a transmittance is higher. Therefore, by remaining of alkoxide in an orgnometallic polymer, a maintenance rate of a transmittance can be enhanced. This is thought as follows: Alkoxide vanishes a silanol group generated by a moisture absorbed into an organometallic polymer.

Examples 15-1 to 15-7

Using organometallic compounds A and B, metal alkoxide X, and an organic acid Y shown in Table 3, a viscous liquid B was synthesized, and this was irradiated with an ultraviolet-ray to cure it. Regarding cured samples, assessment was conducted as in Examples 11 to 15, and the results are shown in Table 3.

TABLE 3

|   | | Synthesis Step | Organometallic Compound A | Organometallic Compound B | Metal Alkoxide X | Organic Acid Y |
|---|---|---|---|---|---|---|
| Ex. | 15-1 | P | 3-Methacryloxy-propyltriethoxysilane | Phenyltrimethoxysilane (2.9 ml) and diphenyldimethoxysilane (2.9 ml) were mixed. | Trimethylethoxysilane | Trifluoroacetic Anhydride |
|   | 15-2 | P | 3-Methacryloxy-propyltriethoxysilane | Diphenyldimethoxysilane (2.9 ml) and pentaethoxyniobium (2.9 ml) were mixed. | Trimethylethoxysilane | Trifluoroacetic Anhydride |
|   | 15-3 | P | 3-Methacryloxy-propyltriethoxysilane | Diphenyldimethoxysilane (2.9 ml) and zirconiumisopropoxide (2.9 ml) were mixed. | Trimethylethoxysilane | Trifluoroacetic Anhydride |
|   | 15-4 | P | 3-Methacryloxy-propyltriethoxysilane | Diphenyldimethoxysilane (2.9 ml) and titaniumisopropoxide (2.9 ml) were mixed. | Trimethylethoxysilane | Trifluoroacetic Anhydride |
|   | 15-5 | P | 3-Methacryloxy-propyltriethoxysilane | Phenyltrimethoxysilane (2.9 ml) and pentaethoxyniobium (2.9 ml) were mixed. | Trimethylethoxysilane | Trifluoroacetic Anhydride |
|   | 15-6 | P | 3-Methacryloxy-propyltriethoxysilane | Phenyltrimethoxysilane (2.9 ml) and zirconiumisopropoxide (2.9 ml) were mixed. | Trimethylethoxysilane | Trifluoroacetic Anhydride |
|   | 15-7 | P | 3-Methacryloxy-propyltriethoxysilane | Phenyltrimethoxysilane (2.9 ml) and titaniumisopropoxide (2.9 ml) were mixed. | Trimethylethoxysilane | Trifluoroacetic Anhydride |

|   | | Light Propagation Loss (dB/cm) | | | Peak Intensity Ratio in IR Analysis (around 1780 $cm^{-1}$)/ (around 1100 $cm^{-1}$) | Amount of Remaining Alkoxide Hydrolysate (% by weight) | Maintenance Rate of Transmittance (%) |
|---|---|---|---|---|---|---|---|
|   |   | 500-1100 nm | 1300-1350 nm | 1450-1550 nm |   |   |   |
| Ex. | 15-1 | 0.5 or Smaller | 0.5 or Smaller | 0.8 | 0.1 | 1 | 98 |
|   | 15-2 | 0.8 | 0.6 | 1.0 | 0.1 | 1 | 96 |
|   | 15-3 | 0.9 | 0.6 | 0.9 | 0.2 | 0.8 | 97 |
|   | 15-4 | 0.9 | 0.8 | 0.9 | 0.2 | 1 | 96 |
|   | 15-5 | 0.8 | 0.6 | 1.0 | 0.1 | 1 | 96 |
|   | 15-6 | 0.9 | 0.6 | 0.9 | 0.2 | 0.8 | 97 |
|   | 15-7 | 0.9 | 0.8 | 0.9 | 0.2 | 1 | 96 |

Examples 15-8 to 15-11

Organometallic polymer materials were synthesized by the following step R.

<Step R>

Using organometallic compounds A and B, metal alkoxide X, and an organic acid Y shown in Table 4, a viscous liquid B was synthesized as in the step P. Separately, a particle Z shown in Table 4 was added to a solvent S to a ratio of 10% by weight, and the materials were mixed and dispersed to obtain a particle dispersion. 1 g of this particle dispersion was added to 1 g of a viscous liquid B, the materials were stirred, and heated and dried at 100° C. to evaporate and remove a solvent S, to obtain a viscous solution D.

This viscous solution D was irradiated with an ultraviolet-ray to cure it, the cured sample was assessed as in the aforementioned Example, and the results are shown in Table 4. An average particle size of a particle Z shown in Table 4 is as follows:

$ZrO_2$ particle (Example 15-8): about 10 nm
$Nb_2O_5$ particle (Example 15-9): about 10 nm
$TiO_2$ particle (Example 15-10): about 20 nm
$SiO_2$ particle (Example 15-11): about 10 nm Result of assessment of Example 1 is also shown in Table 4.

TABLE 4

|   | | Synthesis Step | Organometallic Compound A | Organometallic Compound B | Metal Alkoxide X | Organic Acid Y | Particle Z | Solvent S |
|---|---|---|---|---|---|---|---|---|
| Ex. | 15-8 | R | 3-Methacryloxy-propyltriethoxysilane | Phenyltrimethoxy-silane | Trimethyl-ethoxysilane | Trifluoroacetic Anhydride | $ZrO_2$ | Isopropyl Alchohol |
|   | 15-9 | R | 3-Methacryloxy-propyltriethoxysilane | Phenyltrimethoxy-silane | Trimethyl-ethoxysilane | Trifluoroacetic Anhydride | $Nb_2O_5$ | Ethanol |
|   | 15-10 | R | 3-Methacryloxy-propyltriethoxysilane | Phenyltrimethoxy-silane | Trimethyl-ethoxysilane | Trifluoroacetic Anhydride | $TiO_2$ | Toluene |
|   | 15-11 | R | 3-Methacryloxy-propyltriethoxysilane | Phenyltrimethoxy-silane | Trimethyl-ethoxysilane | Trifluoroacetic Anhydride | $SiO_2$ | Ethanol |
|   | 1 | P | 3-Methacryloxy- | Phenyltrimethoxy- | Trimethyl- | Trifluoroacetic | — | — |

TABLE 4-continued

| | | propyltriethoxysilane | silane | | ethoxysilane | Anhydride | |
|---|---|---|---|---|---|---|---|
| | | Light Propagation Loss (dB/cm) | | | Peak Intensity Ratio in IR Analysis (around 1780 cm$^{-1}$)/ (around 1100 cm$^{-1}$) | Amount of Remaining Alkoxide Hydrolysate (% by weight) | Maintenance Rate of Transmittance (%) | Refractive Index at WaveLength 630 nm |
| | | 500-1100 nm | 1300-1350 nm | 1450-1550 nm | | | | |
| Ex. | 15-8 | 1.1 | 0.7 | 1.2 | 0.2 | 1 | 96 | 1.57 |
| | 15-9 | 1.2 | 0.7 | 1.1 | 0.2 | 1 | 95 | 1.59 |
| | 15-10 | 1.3 | 0.8 | 1.1 | 0.2 | 1 | 90 | 1.59 |
| | 15-11 | 1.0 | 0.5 or Smaller | 1.0 | 0.1 | 1 | 98 | 1.51 |
| | 1 | 0.5 or Smaller | 0.5 or Smaller | 0.8 | 0.1 | 1 | 98 | 1.52 |

As apparent from comparison of Example 1 and Examples 15-8 to 15-11 shown in Table 4, a refractive index of an organometallic polymer material can be controlled by adding a particle Z. When a ZrO$_2$ particle, a Nb$_2$O$_5$ particle, or a TiO$_2$ particle is added as a particle Z, a refractive index can be enhanced. In addition, when a SiO$_2$ particle is added as a particle Z, a refractive index can be lowered.

Examples 15-12 to 15-14

Organometallic polymer materials were synthesized by the following step S.

<Step S>

(1)

Organometallic compound A shown in Table 5: 10 ml
Organometallic compound B shown in Table 5: 4.1 ml
Aqueous solution containing hydrochloric acid as a reaction catalyst (hydrochloric acid of concentration 2N: 1.65 ml)
Ethanol: 20.5 ml After the aforementioned compounds were mixed, the mixture was allowed to stand for 24 hours to hydrolyze an organometallic compound A and an organometallic compound B, followed by polycondensation.

(2)

4 ml of a solution of the resulting polycondensate was taken into a laboratory dish, 10 mg of 1-hydroxy-cyclohexyl-phenyl-ketone as a polymerization initiator was dissolved, and this was heated at 100° C. to evaporate and remove ethanol, to obtain about 1 g of a viscous liquid A.

Into 1 g of a viscous liquid A were mixed:
metal alkoxide X shown in Table 5: 3 ml, and
organic acid Y shown in Table 5: 0.8 ml the mixture was allowed to stand for 24 hours, heated and dried at 100° C. to evaporate and remove excessive metal alkoxide X and an organic acid Y, to obtain a viscous liquid B.

(3)

0.45 g (45% by weight) of an organic polymer Z shown in Table 5 was added to 0.55 g of the viscous liquid B and then stirred to obtain a viscous solution E.

The viscous solution E was irradiated with an ultraviolet-ray to be cured, and the cured sample was assessed in the same manner as the aforementioned Example. The results are shown in Table 5.

The followings are used in Examples as the organic polymer Z:

Example 15-12: urethane acrylate resin
Example 15-13: polyesther acrylate resin
Example 15-14: epoxy acrylate resin

TABLE 5

| | | Synthesis Step | Organometallic Compound A | Organometallic Compound B | Metal Alkoxide X | Organic Acid Y | Organic Polymer Z |
|---|---|---|---|---|---|---|---|
| Ex. | 15-12 | S | 3-Methacryloxy-propyltriethoxysilane | Diphenyl-dimethoxysilane | Trimethyl-ethoxysilane | Trifluoroacetic Anhydride | Urethane Acrylate Resin |
| | 15-13 | S | 3-Methacryloxy-propyltriethoxysilane | Diphenyl-dimethoxysilane | Trimethyl-ethoxysilane | Trifluoroacetic Anhydride | Polyesther Acrylate Resin |
| | 15-14 | S | 3-Methacryloxy-propyltriethoxysilane | Diphenyl-dimethoxysilane | Trimethyl-ethoxysilane | Trifluoroacetic Anhydride | Epoxy Acrylate Resin |

TABLE 5-continued

|   |   | Propagation Loss (dB/cm) | | | Peak Intensity Ratio in IR Analysis (around 1780 cm$^{-1}$)/ (around 1100 cm$^{-1}$) | Amount of Remaining Alkoxide Hydrolysate (% by weight) | Maintenance Rate of Transmittance (%) |
|---|---|---|---|---|---|---|---|
|   |   | 500-1100 nm | 1300-1350 nm | 1450-1550 nm | | | |
| Ex. | 15-12 | 0.5 or Smaller | 0.5 or Smaller | 1.0 | 0.08 | 1 | 98 |
|   | 15-13 | 0.6 | 0.7 | 1.2 | 0.1 | 0.95 | 96 |
|   | 15-14 | 0.5 or Smaller | 0.5 or Smaller | 1.2 | 0.1 | 0.9 | 94 |

When the amount of urethane acrylate resin is varied in a range of 5 to 95% by weight in the composition of Example 15-12, each resulting sample material was translucent, and a transmittance of each sample having a thickness of 3 mm was 80% or more at wavelength of 630 nm. Especially, higher transmittance values were obtained when the amount of urethane acrylate resin is in a range of 20 to 60% by weight. Specifically, the transmittance value at wavelength of 630 nm was 90% or more in each sample having a thickness of 3 mm.

Also when acrylate resin, epoxy resin, or urethane resin was used as the organic polymer Z, the similar result was obtained.

(Assessment of Various Properties)

Using the sample prepared in Example 1, various properties were assessed.

(1) Glass Transition Temperature

Figure 15:
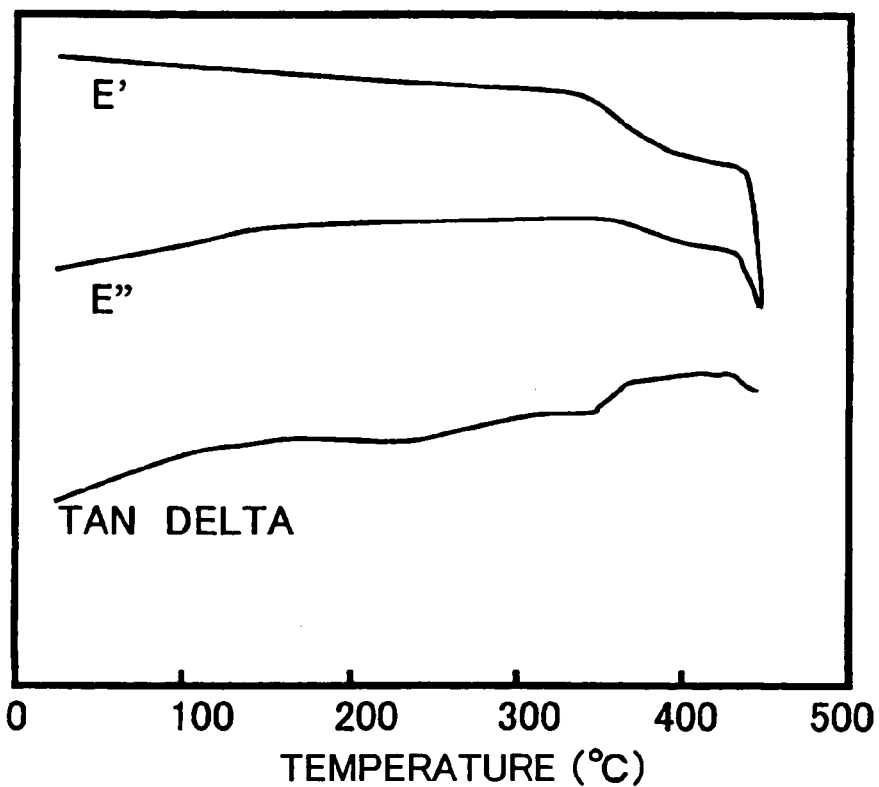
FIG. 15 is a view showing a result of measurement of a glass transition temperature of a cured organometallic polymer material in Example 1 of the present invention.

Using a dynamic viscoelasticity measuring apparatus, a glass transition temperature was assessed. FIG. 15 is a view showing this result. In FIG. 15, E' denotes a storage elastic modulus, E" denotes a loss elastic modulus, and TAN DELTA denotes a loss tangent. There is no change to around 350° C. in all of E', E" and TAN DELTA. Therefore, it is seen that the sample prepared in Example 1 has a high glass transition temperature of 300° C. or higher.

(2) Thermal Deformation Temperature

Using a thermomechanical analysis apparatus (TMA-50 manufactured by Shimadzu Corporation), a thermal deformation temperature was measured. Using this apparatus, a material was heated in the state where an indenter was pushed against a material surface at a constant load, and a displacement when an indenter penetrates into a material due to softening of a material, and a temperature at that time were measured. The results of measurement are shown in FIG. 16.

Figure 16:
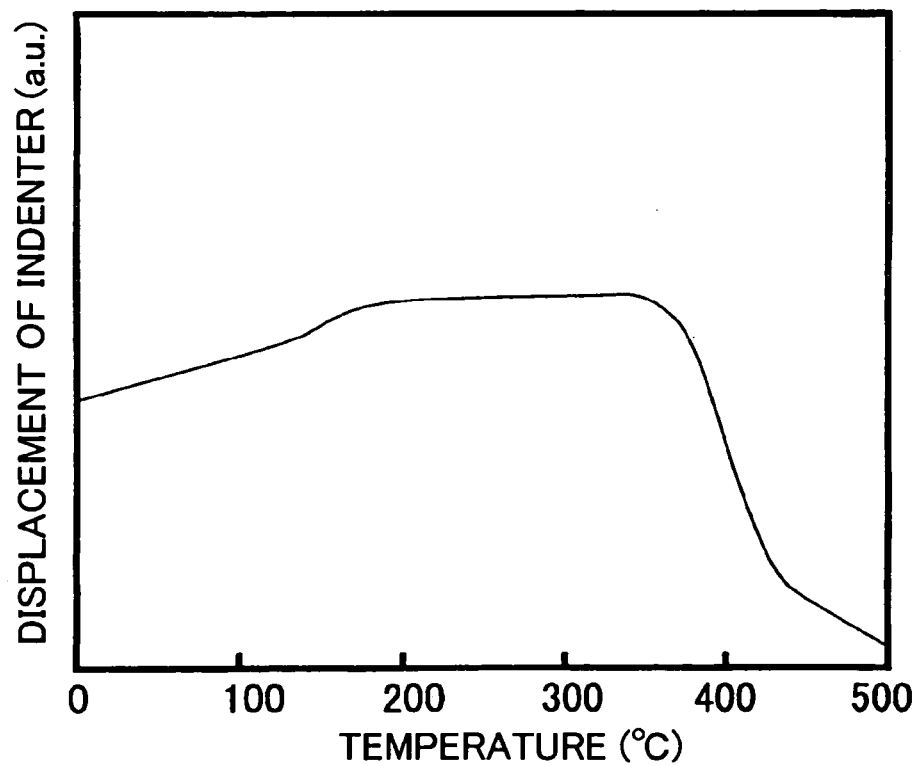
FIG. 16 is a view showing a result of measurement of a thermal deformation temperature of a cured organometallic polymer material in Example 1 of the present invention.

As shown in FIG. 16, an amount of change in a position of an indenter becomes great at around 380° C., and it is seen that a sample has a high thermal deformation temperature of 350° C. or higher.

(3) Temperature Dependency of Refractive Index

Figure 17:
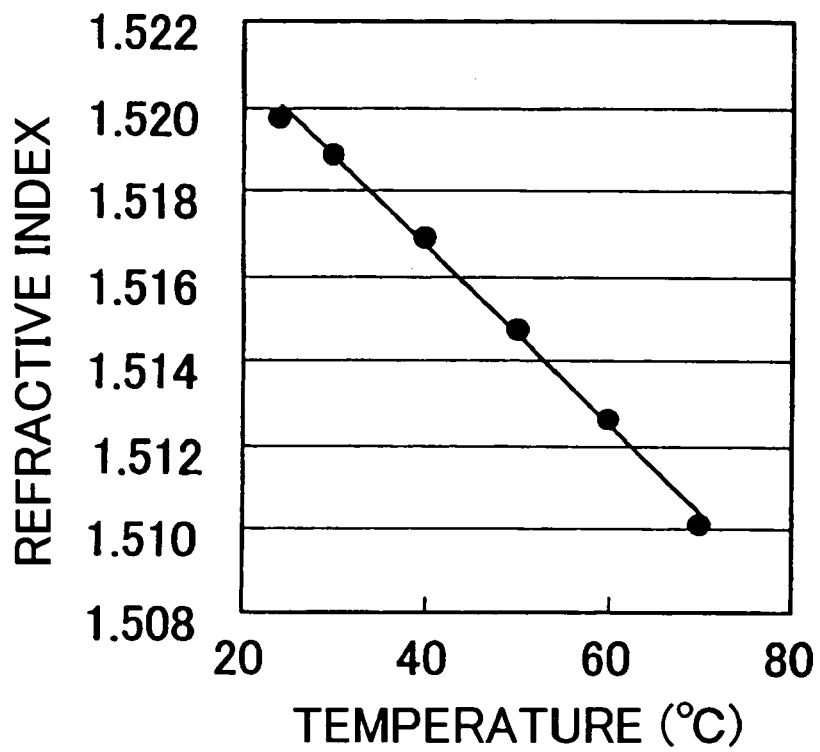
FIG. 17 is a view showing a result of measurement of temperature dependency of a refractive index of a cured organometallic polymer material in Example 1 of the present invention.

Temperature dependency of a refractive index was measured at a measurement wavelength of 630 nm using a prism coupler apparatus. The results of measurement are shown in FIG. 17. It is seen that, from a slope of a straight line shown in FIG. 17, temperature dependency of a refractive index of a sample is about $2 \times 10^{-4}$/° C.

(4) Measurement of Birefringence Property

Using a prism coupler apparatus, birefringence property was measured at a measurement wavelength of 630 nm and 1300 nm. Herein, birefringence property was assessed by an absolute value of difference (Δn) between a refractive index in TE mode and a refractive index in TM mode. Measurement was conducted using 10 samples and, as a result, each value of Δn at both wavelengths of 630 nm and 1300 nm is 0.0005 or less.

(5) Measurement of Density

A density of a sample was measured according to a water replacement method (JIS K7112-1980) and, as a result, a density was about 1.2 g/cm$^3$ at 23° C. In addition, a volume curing shrinkage rate calculated using this density was about 3.5%.

(6) Measurement of Refractive Index Controlling Range

Samples were prepared by changing a ratio of mixing an organometallic compound A (MPTES) and an organometallic compound B (PhTMS) in Example 1, and a refractive index of each of the resulting samples was measured. A refractive index was measured at a measurement wavelength of 630 nm using a prism coupler apparatus.

Figure 18:
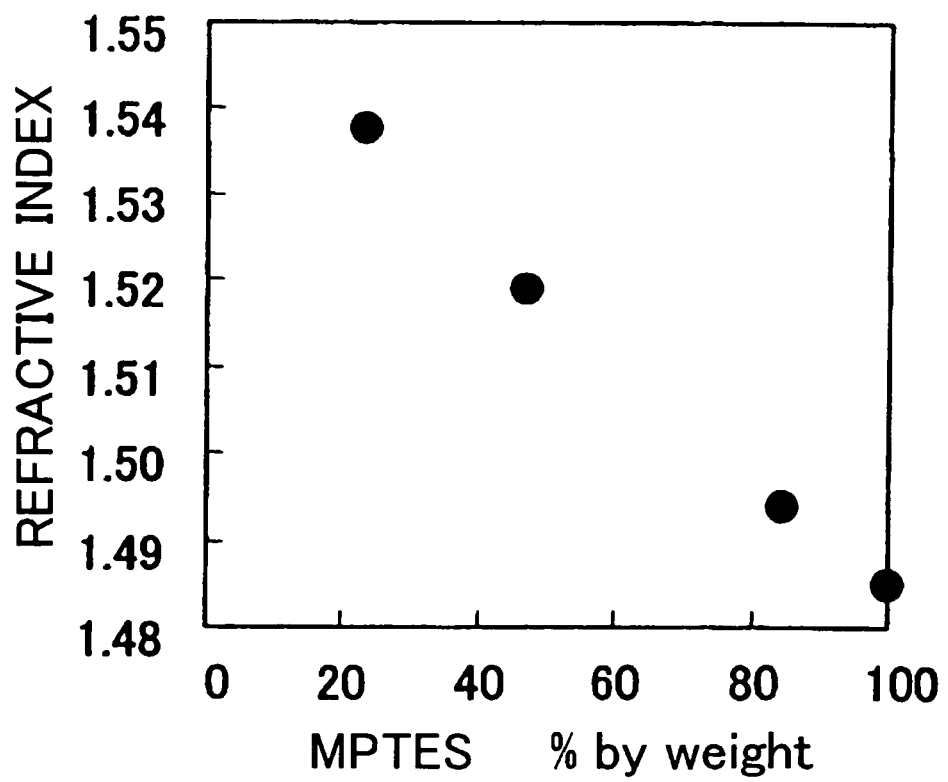
FIG. 18 is a view showing is a change in a refractive index when a ratio of mixing of organometallic compounds A and B in Example 1 of the present invention is changed.

FIG. 18 is a view showing a relationship between a MPTES content (% by weight) in a sample and a refractive index of a sample. As shown in FIG. 18, it is seen that, by changing a ratio of mixing organometallic compounds A and B, a refractive index can be controlled.

(7) Measurement of Water Absorption Rate

Each of the samples obtained by changing a ratio of mixing an organometallic compound A (MPTES) and an organometallic compound B (PhTMS), prepared in the above (6), was measured for a water absorption rate. A measured water absorption rate is a water absorption rate when allowed to stand in water at 23° C. for 24 hours, and was measured according to JIS K7209-1984. As a result, water absorption rates of all samples were 1% by weight or smaller.

(8) Molecular Weight of Precursor (Liquid before Curing)

Regarding a precursor before ultraviolet-ray irradiation in Example 1, its polymerization degree was measured by a gel permeation chromatography analysis method. As an eluent, chloroform was used. As a result, a weight average molecular weight was about 2000.

(9) Change in Birefringence Property Due to Difference in Curing Method

Figure 21:
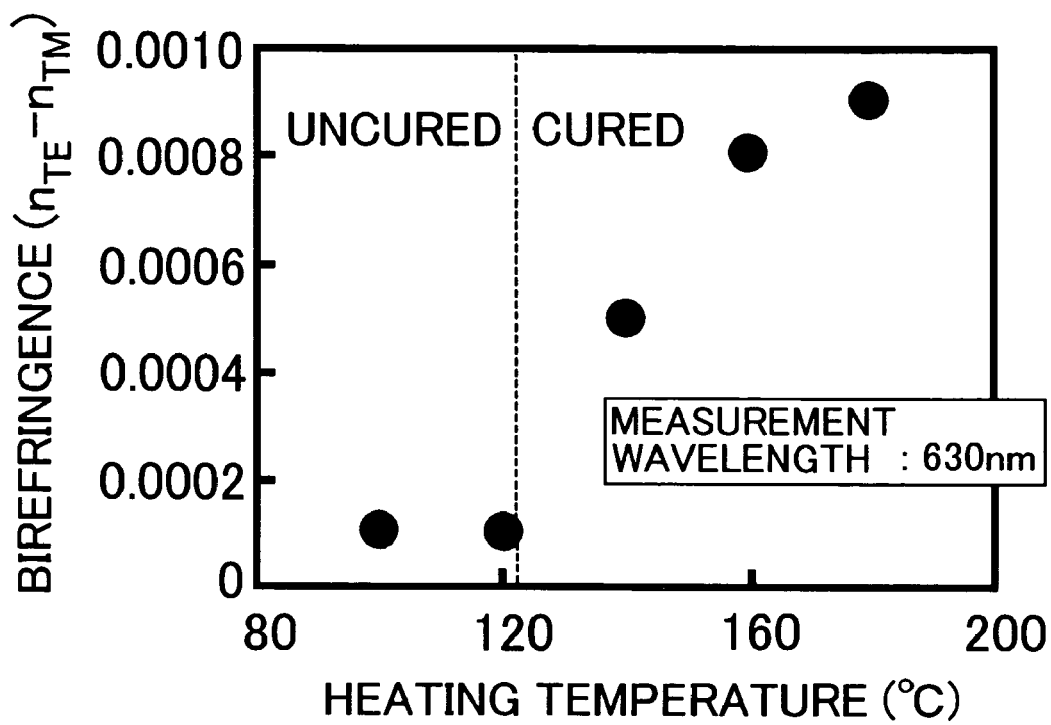
FIG. 21 is a view showing a relationship between a heating temperature and birefringence when an organometallic polymer layer of the present invention is formed by heating and curing.

Birefringence property of an organometallic polymer material obtained by heating and curing a viscous liquid B of Example 1, and birefringence property of an organometallic polymer material obtained by curing a viscous liquid B of Example 1 with an ultraviolet-ray were studied by comparison. A viscous liquid B was added dropwise to a glass substrate, heated and cured at each temperature of 100° C., 120° C., 140° C., 160° C., and 180° C. and, regarding a cured coated film (thickness 20 μm), birefringence property was assessed at a measuring wavelength 630 nm using a prism coupler apparatus as described above. The results of assessment are shown in FIG. 21. A heating time was 1 hour.

Figure 22:
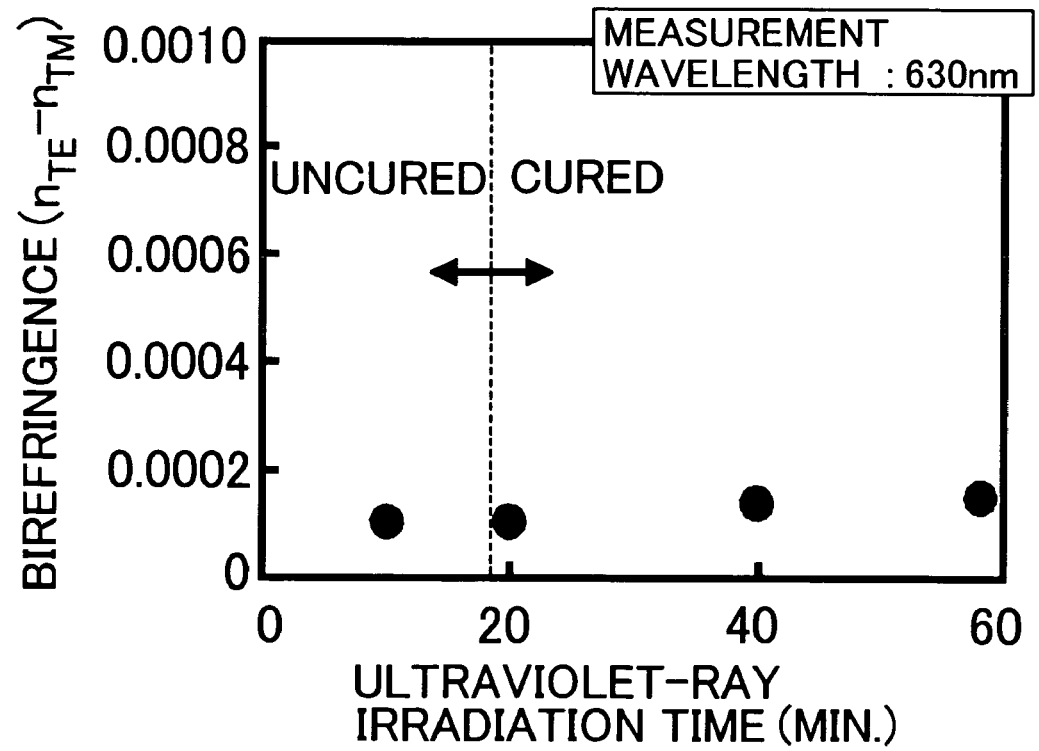
FIG. 22 is a view showing a relationship between an ultraviolet irradiation time and birefringence when an organometallic polymer layer of the present invention is formed by ultraviolet curing.

In addition, after a viscous liquid B was added dropwise to a glass substrate as described above, this was irradiated with an ultraviolet-ray (wavelength 365 nm) at an irradiation dose of about 4 μW/cm² at room temperature, to cure a viscous liquid B. An ultraviolet-ray irradiation time was 10 minutes, 20 minutes, 40 minutes and 60 minutes. Regarding a cured coated film (thickness 20 μm), birefringence property was measured as described above, and The results of assessment are shown in FIG. 22.

As shown in FIG. 21, curing could not be conducted when a heating temperature was 100° C. or 120° C. In addition, as shown in FIG. 22, curing could not be conducted when an ultraviolet-ray irradiation time was 10 minutes. As apparent from FIG. 21, a tendency was perceived that as a heating temperature was higher, birefringence was larger. To the contrary, in the case of curing with ultraviolet-ray irradiation, as shown in FIG. 22, even when an ultraviolet-ray irradiation time was increased, little change in birefringence was recognized. A cause why as a heating temperature grows higher, birefringence grows larger is thought that a difference in thermal expansion coefficients in a substrate glass and an organometallic polymer material influences thereon.

Figure 23:
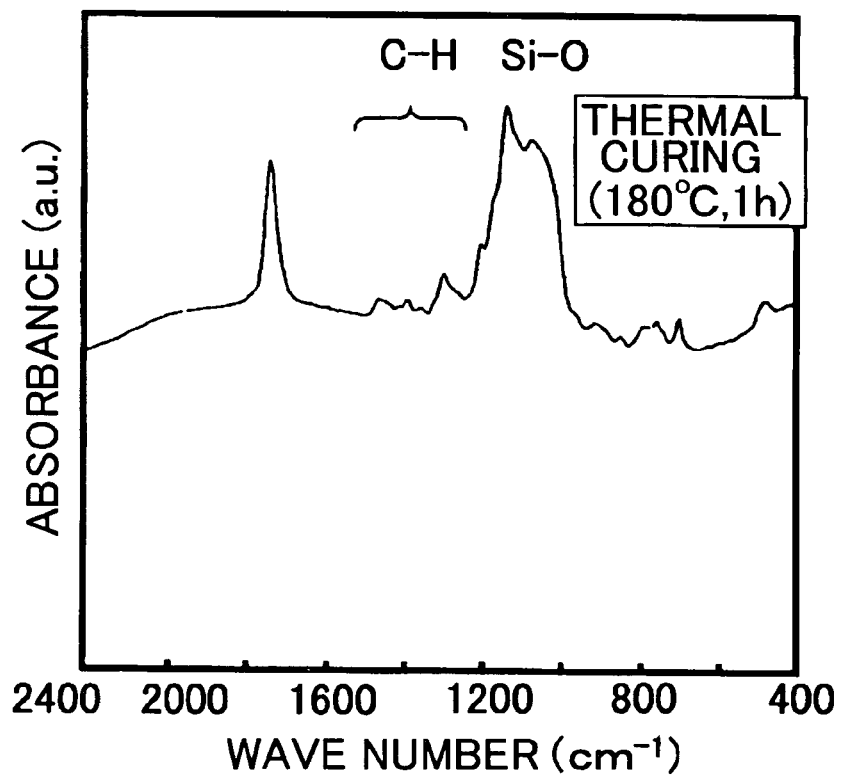
FIG. 23 is a view showing an IR chart of organometallic polymer materials when an organometallic polymer layer of the present invention is heated and cured, and when the layer is ultraviolet cured.

FIG. 23 is a view showing IR charts of an organometallic polymer material obtained by heating and curing at 180° C. for 1 hour. As shown in FIG. 23 and FIG. 13(a), it is seen that in the case of heating and curing and in the case of ultraviolet-ray curing, almost the same peak is obtained, and almost the same cured product is obtained.

From the forgoing, it is seen that, when one wants to form an organometallic polymer material having low birefringence, ultraviolet-ray curing is preferable.

(10) Relationship Between Refractive Index and Birefringence

A ratio of mixing organometallic compounds A and B is changed in Example 1, whereby, a refractive index is changed, and a relationship between a refractive index and birefringence was studied.

Figure 24:
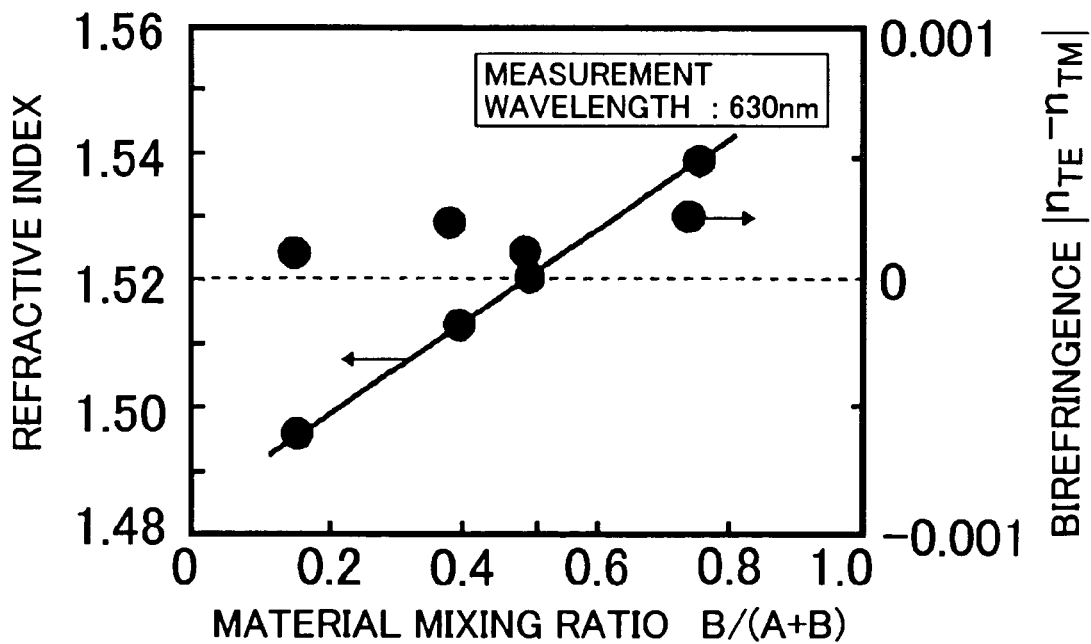
FIG. 24 is a view showing a relationship between a ratio of mixing organometallic compounds A and B, a refractive index and birefringence.

FIG. 24 is a view showing a refractive index and birefringence when a ratio of mixing organometallic compounds A and B is changed. As apparent from FIG. 24, it is seen that, even when a refractive index is changed, birefringence is hardly changed, and low birefringence is obtained.

Example 16

Figure 4:
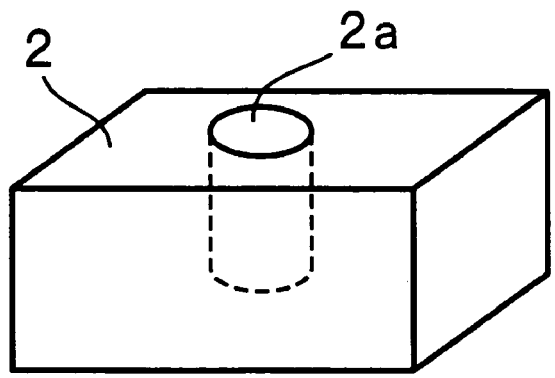
FIG. 4 is a perspective showing a step of preparing a cylindrical lens in Example of the present invention.
Figure 4:
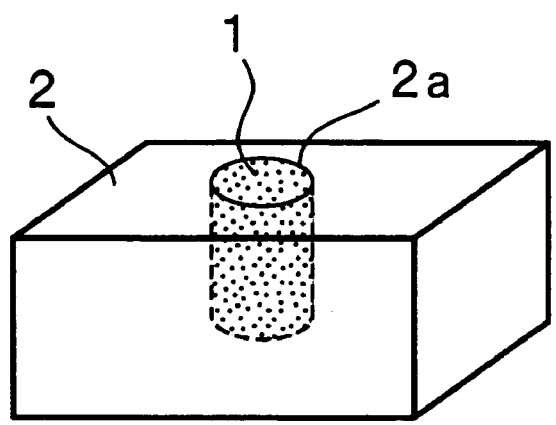
Figure 4:
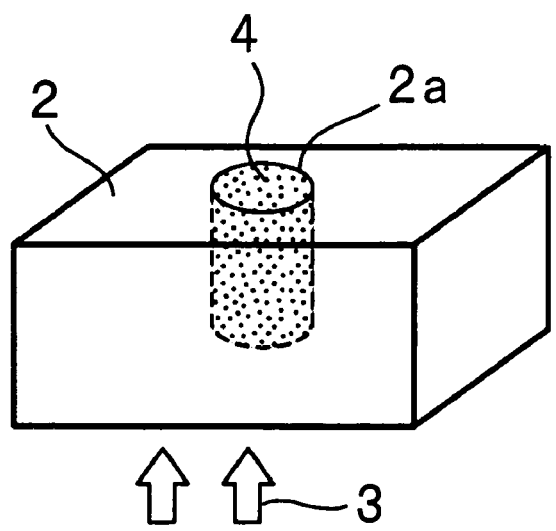

Using a viscous liquid B of Example 1, a cylindrical lens was prepared. As shown in FIG. 4(a), a silicone rubber mold 2 having a cylindrical concave part 2a of a diameter 5 mm and a depth 10 mm was used and, as shown in FIG. 4(b), a solution 1 composed of a viscous liquid B was cast into a concave part 2a of a mold 2.

Then, as shown in FIG. 4(c), an ultraviolet-ray 3 was irradiated to cure a solution 1 to prepare a cylindrical lens 4.

Example 17

Figure 5:
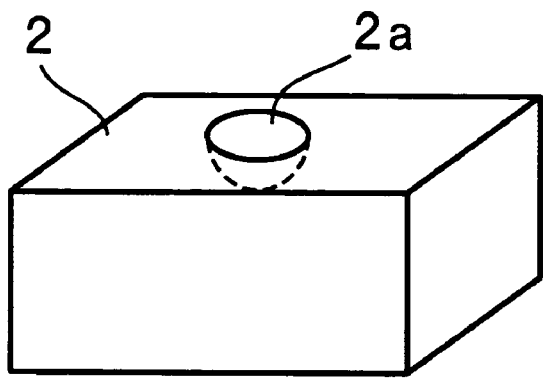
FIG. 5 is a perspective showing a step of preparing a hemi-spherical lens in Example of the present invention.
Figure 5:
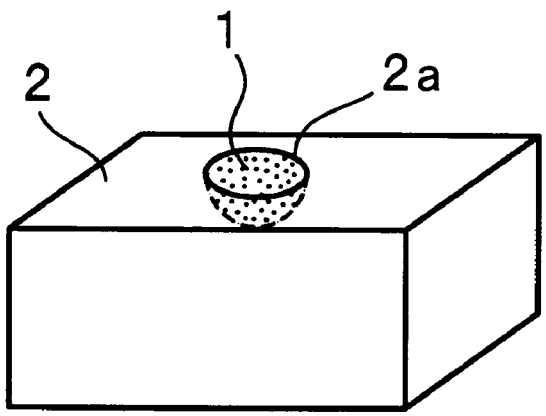
Figure 5:
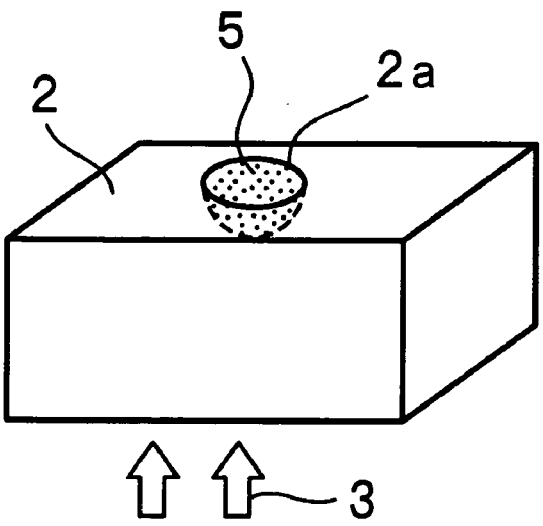

Using a viscous liquid B of Example 1, a hemi-spherical lens was prepared. As shown in FIG. 5(a), a silicone rubber mold 2 having a hemi-spherical concave part 2a of a diameter 5 mm was used and, as shown in FIG. 5(b), a solution 1 composed of a viscous liquid B was cast into a concave part 2a of a mold 2 and, as shown in FIG. 5(c), an ultraviolet-ray 3 was irradiated to cure a solution, whereby, a hemi-spherical lens 5 was prepared.

Example 18

Figure 6:
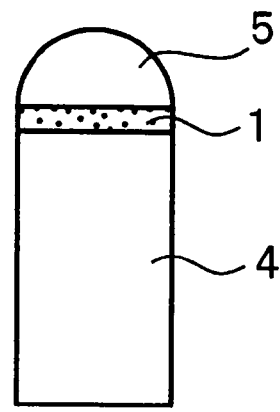
FIG. 6 is a perspective showing a step of preparing a shell-type lens in Example of the present invention.
Figure 6:
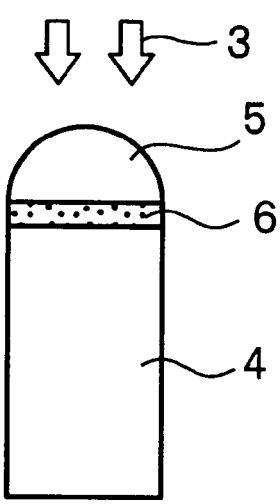
Figure 6:
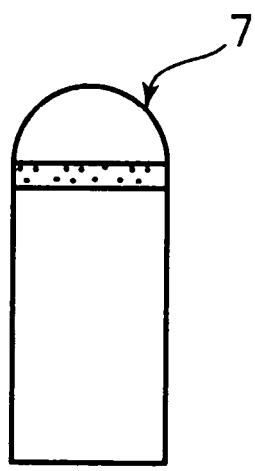

As shown in FIG. 6(a), a cylindrical lens 4 prepared in Example 16, a hemi-spherical lens 5 prepared in Example 17, and a solution 1 composed of a viscous liquid B of Example 1 were laminated using an adhesive.

In the state shown in FIG. 6(b), an ultraviolet-ray 3 was irradiated to cure an adhesive 6, whereby, a shell-type lens 7 as shown in FIG. 6(c) was prepared.

Example 19

Figure 7:
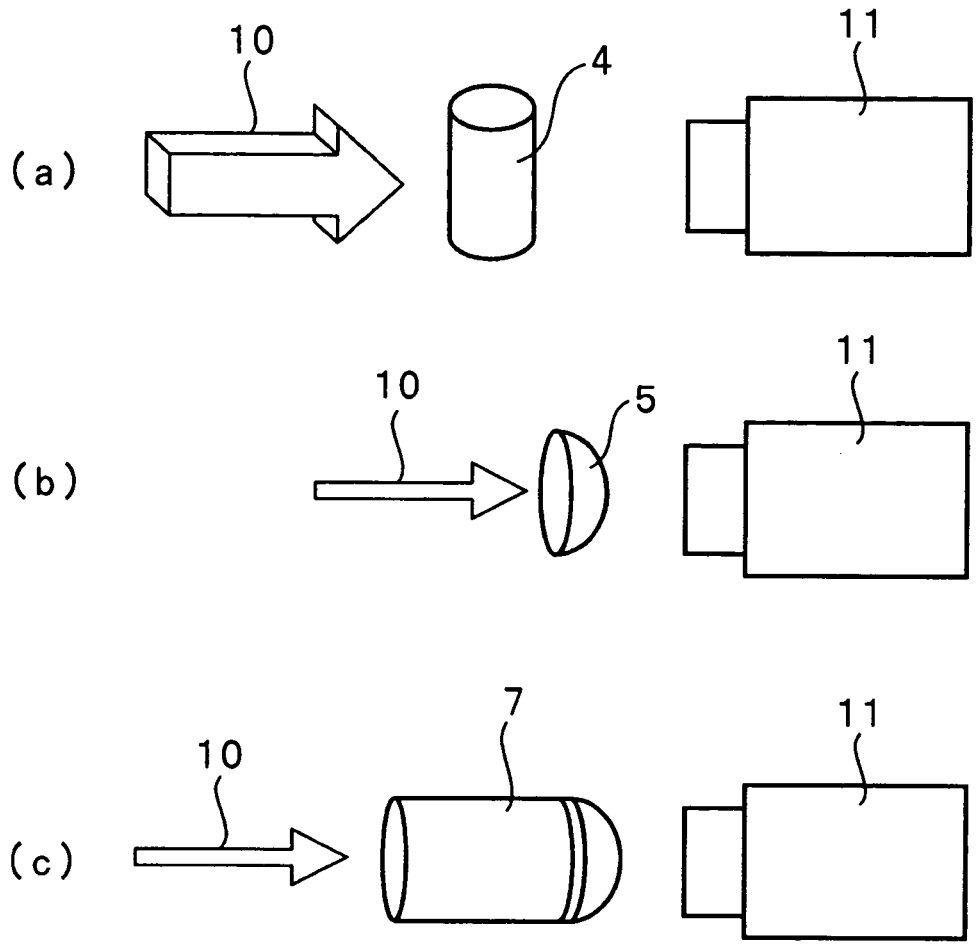
FIG. 7 is a view showing schematically a method of assessing a cylindrical lens, a hemi-spherical lens and a shell-type lens prepared in Examples of the present invention.

As shown in FIG. 7(a), a rectangular beam 10 (wavelength 1550 nm) of a beam size 2 mm×5 mm was introduced into a cylindrical lens 4 prepared in Example 16, and the emitted light was observed with an infrared-ray camera 11. As a result, a beam of a spot size 0.1 mm×5 mm was obtained, and it was confirmed that a cylindrical lens 4 has light condensing property.

As shown in FIG. 7(b), a light beam (wavelength 1550 nm) of a beam diameter 2 mm was introduced into a hemi-spherical lens 5 prepared in Example 17, and the emitted light was observed with an infrared-ray camera 11. As a result, a beam of a spot size of a diameter 0.1 mm was obtained, and it was confirmed that a hemi-spherical lens 5 has light condensing property.

As shown in FIG. 7(c), a light beam (wavelength 1550 nm) of a beam diameter 2 mm was introduced into a shell-type lens 7 prepared in Example 18, and the emitted light was observed with an infrared-ray camera 11. As a result, a beam of a spot size of a diameter 0.1 mm was obtained, and it was confirmed that a shell-type lens 7 has light condensing property.

Comparative Example 3

By using an acryl-based ultraviolet curing resin in place of a viscous liquid B of Example 1 as an adhesive in Example 18, a shell-type lens was prepared. Regarding this shell-type lens, a heat resistance test at 180° C. for 10 hours was conducted, peeling of an adhesion part occurred in eight samples of ten samples. To the contrary, in a shell-type lens prepared in Example 18, no peeling at an adhesion part was perceived in all ten samples.

Example 20

Figure 8:
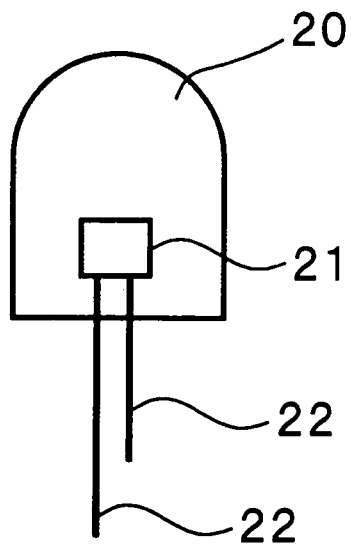
FIG. 8 is a cross-sectional view showing a white LED element prepared in Example of the present invention.

10 parts by weight of a white fluorescent material was mixed into 100 parts by weight of a viscous solution B of Example 1, this mixed solution was molded at a periphery of an an ultraviolet-ray LED chip, and this was cured by irradiating with an ultraviolet-ray (365 nm) to prepare a white LED element. FIG. 8 is a cross-sectional view showing this white LED element. As shown in FIG. 8, a mold 20 is formed around an ultraviolet-ray LED chip 21, and an electrode lead 21 is taken out of a mold 20.

A reduction rate of light output after 1000 hours continuous lighting was about 2%.

Comparative Example 4

By using an epoxy resin in place of a viscous solution B in Example 20, a molded white LED element was prepared. Reduction in light output after 1000 hours continuous lighting was about 4%.

Example 21

Figure 9:
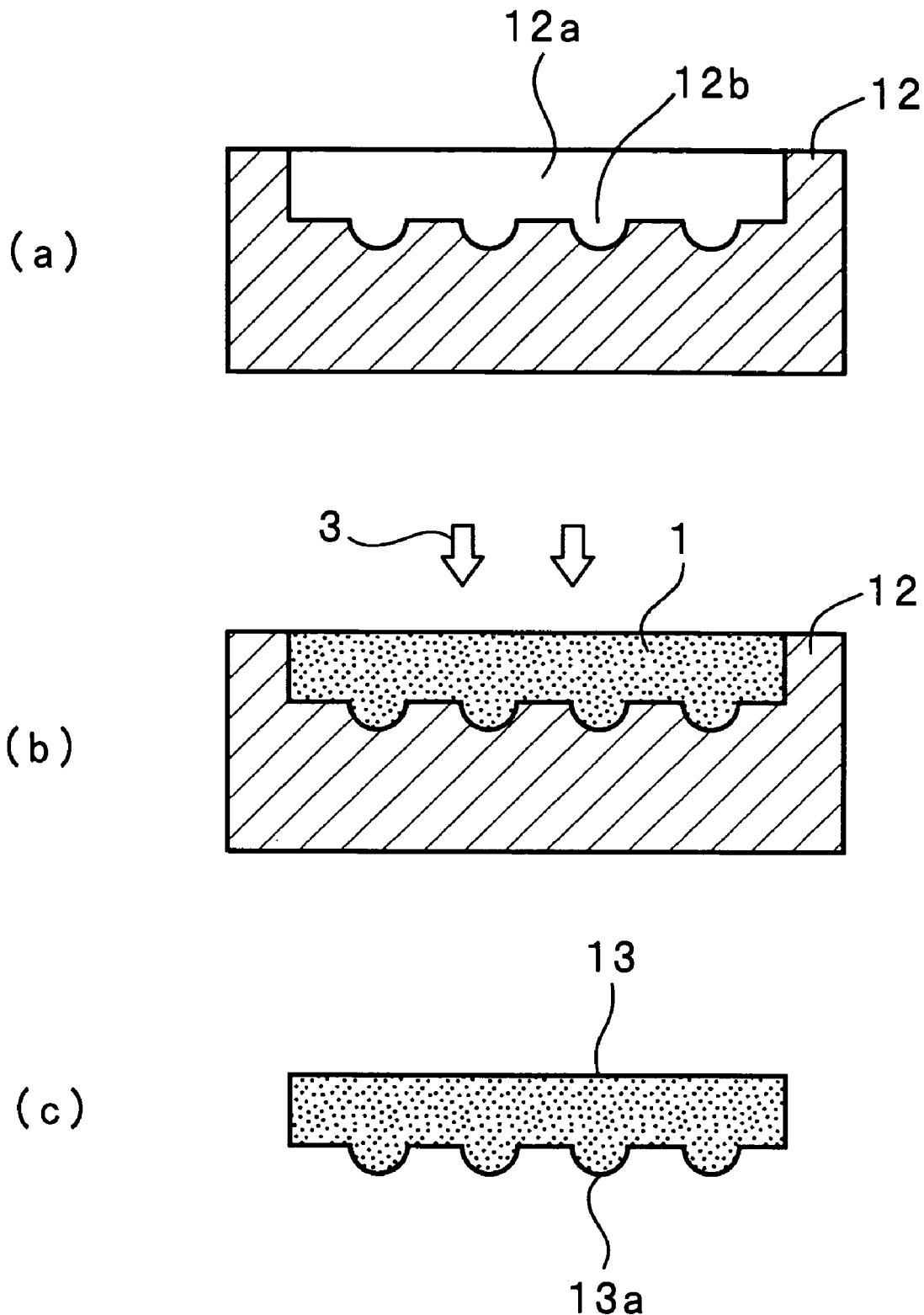
FIG. 9 is a cross-sectional view showing a step of preparing a lens array prepared in Example of the present invention.

By using a viscous liquid B of Example 1, an optical communication lens array was prepared. A silicone rubber mold 12 shown in FIG. 9(a) was used. In a mold 12, a rectangular concave part 12a is formed, and a hemi-spherical concave part 12b is further formed on a bottom of a concave part 12a. As shown in FIG. 9(b), a viscous solution 1 composed of a viscous liquid B was cast into the concave parts 12a and 12b, and irradiated with an ultraviolet-ray 3 to cure a solution 1. Thereby, a lens array 13 having a hemi-spherical lens part 13a shown in FIG. 9(c) was obtained. A hemi-spherical lens part 13a is formed at an interval of 250 μm.

Figure 10:
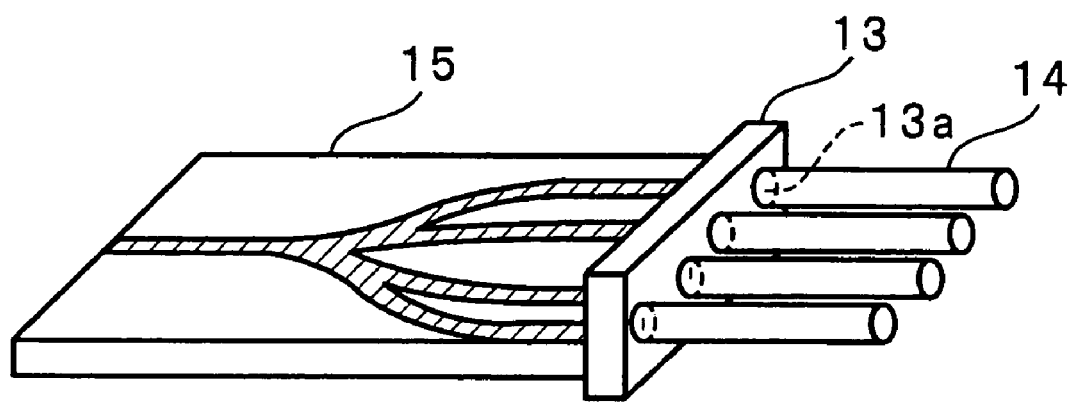
FIG. 10 is a perspective showing the state where a lens array prepared in Example of the present invention is disposed between an optical fiber and an optical splitter.

Then, as shown in FIG. 10, this lens array 13 was disposed between an optical fiber 14 and an optical splitter 15, and a gap between an optical fiber 14 and a lens array 13, and a gap between a lens array 13 and an optical splitter 15 were fixed using a viscous liquid B of Example 12, to perform optical coupling. As a result, coupling loss was reduced by 0.4 dB as compared with the case where a lens array 13 is not used.

Example 22

By using an optically cured product of a viscous liquid B of Example 1 as a core material, and an optically cured product of a viscous liquid B' in which a refractive index after optically curing was set smaller than an optically cured product of a viscous liquid B by about 0.006 by changing a ratio of mixing organometallic compounds A and B, as a cladding, a 4-branched light waveguide was prepared.

Figure 11:
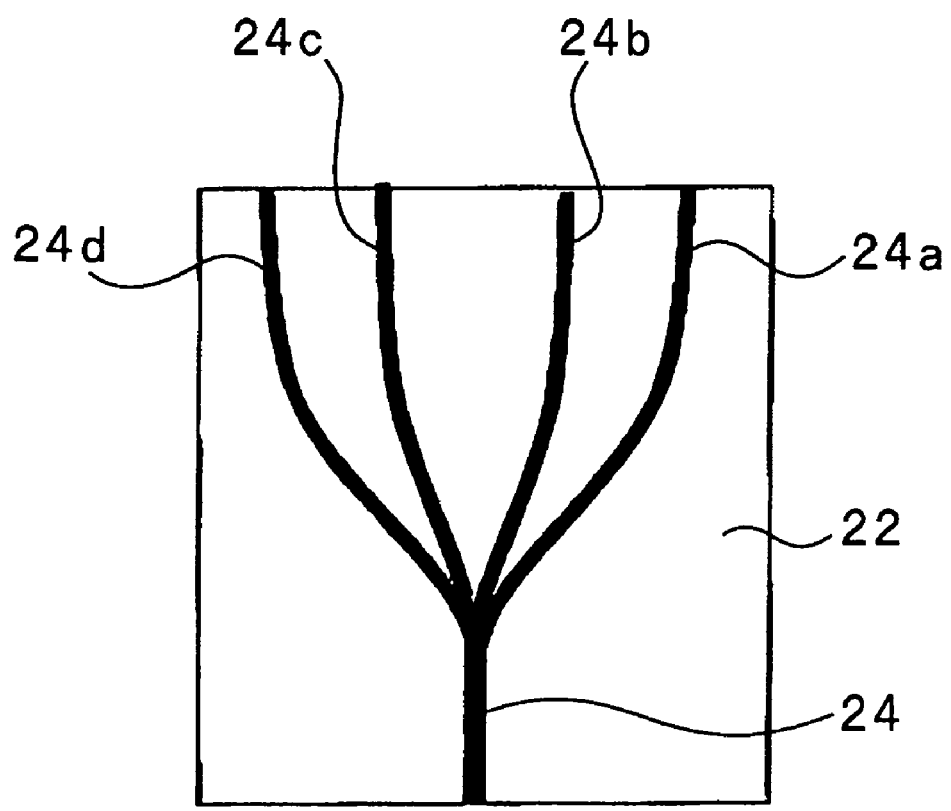
FIG. 11 is a plane view showing a four-branched light waveguide prepared in Example of the present invention.

FIG. 11 is a plane view showing a branched pattern of a core of the prepared 4-branched light waveguide. As shown in FIG. 11, a core 24 is branched into four branched cores 24a to 24d, and these are surrounded by a cladding 22.

Figure 12:
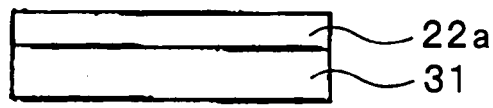
FIG. 12 is a cross-sectional view showing a step of preparing a four-branched light waveguide shown in FIG. 11.
Figure 12:
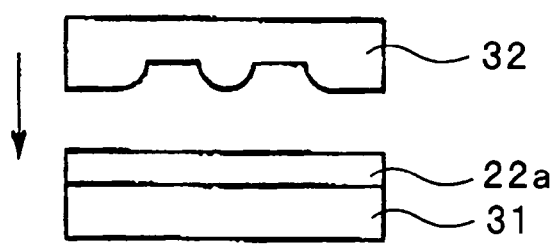
Figure 12:
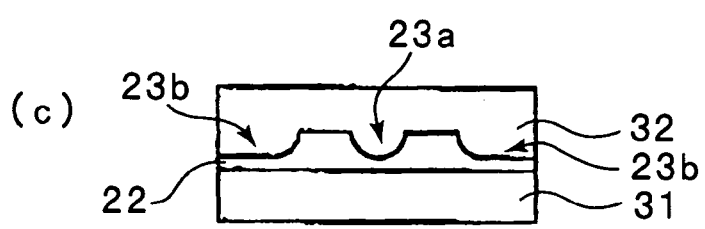
Figure 12:
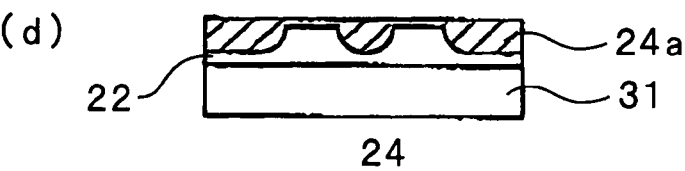
Figure 12:
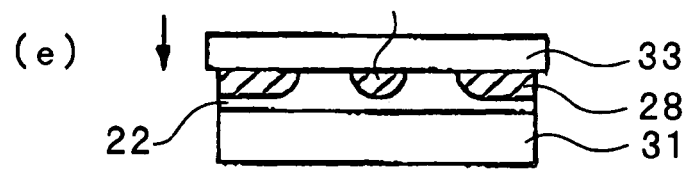
Figure 12:
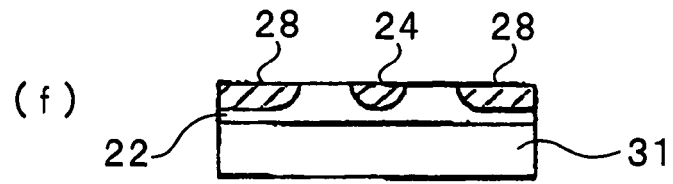
Figure 12:
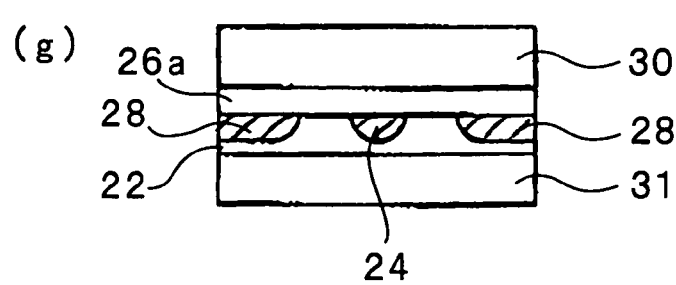

FIG. 12 is a cross-sectional view showing a step of preparing the 4-branched light waveguide shown in FIG. 11. As shown in FIG. 12(a), a viscous liquid B' which is a cladding solution is coated on a glass substrate 31, to form a cladding solution layer 22a. Then, as shown in FIG. 12 (b), a convex stamper 32 was abutted against a cladding solution layer 22a and, in the state shown in FIG. 12(c), a cladding solution layer 22a was irradiated with an ultraviolet-ray of a wavelength 365 nm to form a first cladding layer 22. A concave part 23a and a concave part 23b are formed on a first cladding layer 22.

After a convex stamper 32 was removed, as shown in FIG. 12(d), a viscous liquid B which is a core solution was coated on a first cladding layer 22, a core solution was filled in concave parts 23a and 23b, and a silicone rubber flat plate 33 having a durometer hardness A56 was pushed thereagainst at a pressure of 200 gf/cm² and, in this state, an ultraviolet-ray of a wavelength 365 nm was irradiated to cure a core solution layer 24a. Thereby, a core 24 (core diameter 7 μm) and a light absorber layer 28 were formed. A light absorber layer 28 is composed of the same material as that of a core 24, and has effect of absorbing the light leaked from a core 24. A light absorber layer 28 is not shown in FIG. 11.

A flat plate 33 was removed into the state of FIG. 12 (f), a viscous liquid B' which is a cladding solution was coated on a core 24 and a light absorber layer 28 to form a cladding solution layer, a glass substrate 30 was placed thereon, and an ultraviolet-ray was irradiated to cure a cladding solution layer to form a second cladding layer 26a.

The light of a wavelength 1300 nm or 1550 nm was introduced into the thus prepared 4-branched light waveguide through a single mode optical fiber having a core diameter of about 7 μm and, as a result, it was confirmed by an infrared-ray camera that the 4-branched light was output from an output terminal after four branching.

As described above, the organometallic polymer material of the present invention can be used as various optical devices and adhesive compositions.

The organometallic polymer material of the present invention is excellent in heat resistance and transparency, and heat resistance of a glass transition temperature of 300° C. or higher is obtained.

In addition, by using the organometallic polymer material of the present invention, treatment at a high temperature which was difficult in the previous substrate material of a plastic becomes possible. For example, when a plastic substrate is used in a pigment-sensitized solar cell using titanium oxide as a power generating layer, since heating could not be performed at a high temperature in the previous plastic substrate, sintering of titanium oxide did not proceed, and a conversion efficacy was around 5%. However, by using the organometallic polymer material of the present invention, heating at around 300° C. becomes possible, and a conversion efficacy can be increased to around 8%.

Example 23

Examples of a method of coating the organometallic polymer material of the present invention on a substrate to form a layer having better adherability include a method of increasing an amount of an OH group of a silanol group or the like on a substrate side and decreasing the amount on a surface side as described above. An embodiment of a laminated structure of the present invention in accordance with this method will be explained below.

Figure 19:
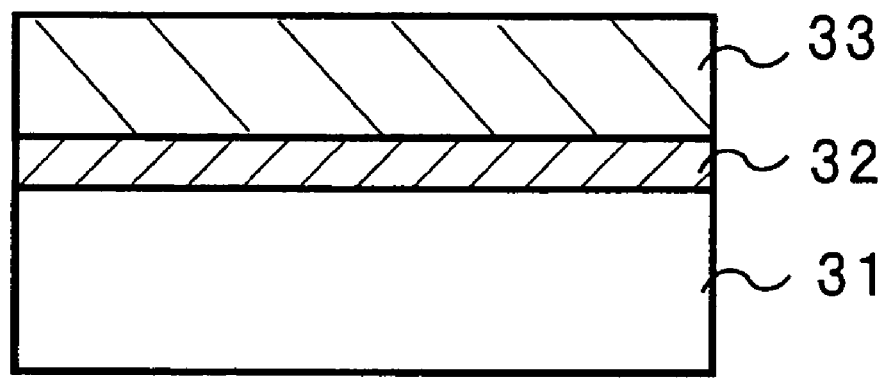
FIG. 19 is a cross-sectional view showing one example of a laminated structure of the present invention.

FIG. 19 is a cross-sectional view showing one example of a laminated structure in accordance with the present invention. A first organometallic polymer layer 32 is formed on a glass substrate 31, and a second organometallic polymer layer 33 is formed thereon. First and second organometallic polymer layers 32 and 33 are both an organometallic polymer formed from metal alkoxide. A silanol group which is an OH group is contained in a first organometallic polymer layer 32 in a relatively large amount, and a silanol group is contained in a second organometallic polymer layer 33 in a relatively smaller amount.

Figure 20:
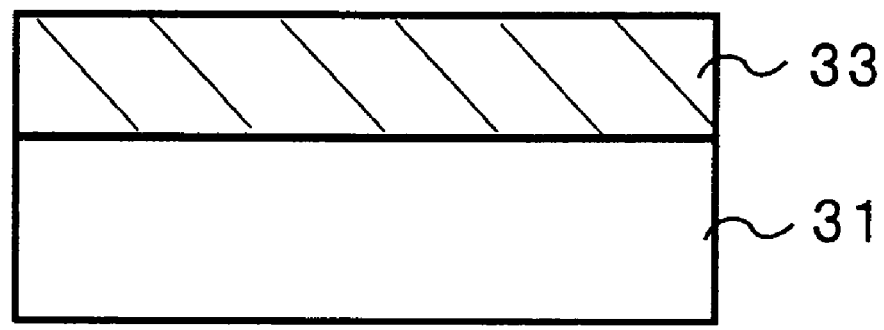
FIG. 20 is a cross-sectional view showing a structure prepared for comparison.

A first organometallic polymer layer 32 was formed using a precursor (viscous liquid) of Comparative Example 1. Specifically, a precursor of Comparative Example 1 was spin-coated on a glass substrate 31 and, thereafter, this was heated at 140° C. for 1 hour to form an about 2 μm first organometallic polymer layer 32. Then, a precursor of Example 1 (viscous liquid) was coated on a first organometallic polymer layer 32, and irradiated with an ultraviolet-ray to cure it as in Example 1, to form a second organometallic polymer layer 33 having a thickness of about 70 μm. As comparison, as shown in FIG. 20, a second organometallic polymer layer 33 was directly formed on a glass substrate 31 without forming a first organometallic polymer layer 32.

Respective ten samples were prepared, respective samples were allowed to stand for 48 hours under high temperature and high humidity condition of 85° C. and 80%, and a peeling test was performed. In a comparative sample shown in FIG. 20, three of ten samples were peeled. However, in a sample on which a first organometallic polymer layer 32 was formed as shown in FIG. 19, no peeling was perceived in all samples.

The reason why adherability with a substrate was improved in a laminated structure shown in FIG. 19, is thought as follows: That is, on a surface of a substrate containing an oxide such as a glass as a main component, an OH group is present in a large amount. However, an OH group in a material is extremely decreased in a second organometallic polymer layer 33 in order to reduce light loss, and it is difficult to perform a polycondensation reaction with an OH group on a substrate surface. By providing a first organometallic polymer layer 32 having an OH group in a relatively large amount between such the second organometallic polymer layer 33 and a substrate 31, it is thought that an OH group on a substrate surface and an OH group of a first organometallic polymer layer thereon are bound by polycondensation. In addition, it is thought that a strong bond is generated by photopolymerization of an acryl group between a first organometallic polymer layer 32 and a second organometallic polymer layer 33. In addition, it is confirmed that a material of a first organometallic polymer layer 32 has a glass transition temperature of 300° C. or higher as in a material of a second organometallic polymer layer 33.

Example 24

According to the same manner as that of Example 23 except that, upon formation of a laminated structure shown in FIG. 19, a first organometallic polymer layer 32 was formed by using a precursor (viscous liquid) prepared as in Example 1 using only an organometallic compound A (MPTES) without using an organometallic compound B (PHTMS) in Example 23, a laminated structure was prepared. Regarding ten samples of the resulting laminated structure, a peeling test was performed as in Example 23, and no peeling was perceived in all of ten samples.

Example 25

According to the same manner as that of Example 22 except that, in preparation of a 4-branching light waveguide of Example 22 as shown in FIG. 12, a first organometallic polymer layer having an OH group in a relatively large amount was formed at a thickness of 2 μm on a glass substrate 31 as in Example 23, and a cladding solution layer 22a is formed thereon as in Example 23, a 4-branching light waveguide was prepared. When a peeling test was performed on the resulting light waveguide as in Example 23, no peeling was perceived in all of ten samples. Therefore, it was confirmed that adherability with a substrate was better.

Example 26

A composite-type non-spherical lens was prepared using a viscous solution B of Example 1. A composite-type non-spherical lens is a non-spherical lens prepared by using a spherical lens or a flat plate made of a glass or a resin as a matrix material, to form a non-spherical resin layer on an optical plane of this matrix material.

Figure 25:
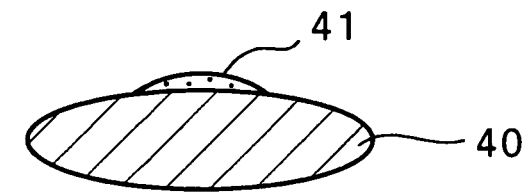
FIG. 25 is a cross-sectional view showing schematically one example of a step of preparing a composite-type non-spherical lens of the present invention.
Figure 25:
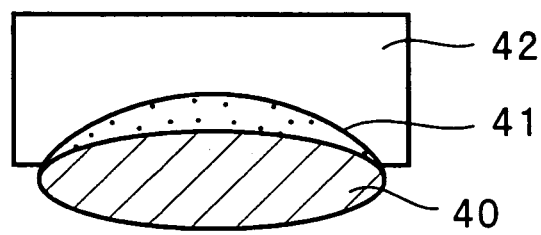
Figure 25:
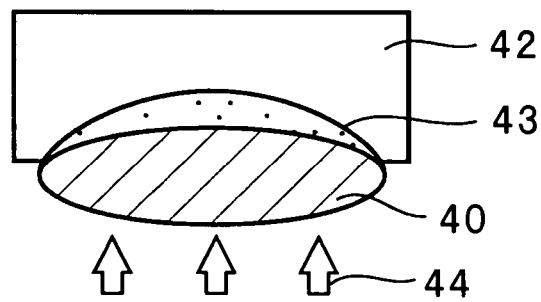
Figure 25:
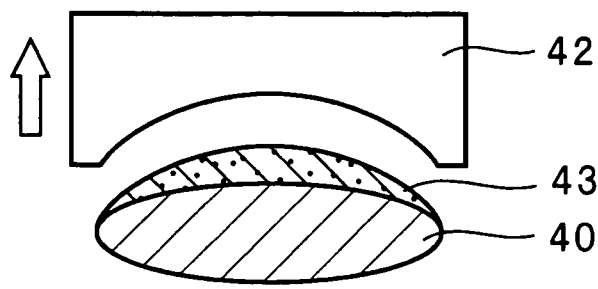
Figure 25:
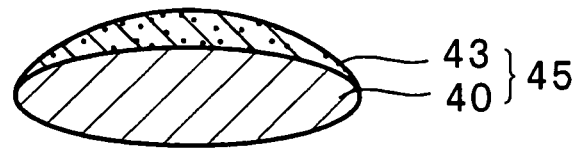

As shown in FIG. 25(a), a viscous solution 41 was added dropwise to a glass spherical lens 40 (matrix material glass) having a diameter of 5 mm and a maximum thickness of 1 mm. A viscous solution 41 is the viscous solution B of Example 1. Then, as shown in FIG. 25(b), a nickel mold 42 having a non-spherical shape on an internal surface is pushed against a viscous solution 41 on a glass spherical lens 40, and an ultraviolet-ray 44 was irradiated from a glass spherical lens 40-side as shown in FIG. 25(c), to cure a viscous solution 41, whereby, a resin layer 43 made of an organometallic polymer material was formed.

Then, as shown in FIG. 25(d), a mold 42 was removed to obtain a composite-type non-spherical lens 45 composed of a glass spherical lens 40 and a resin layer 43 as shown in FIG. 25(e).

Figure 26:
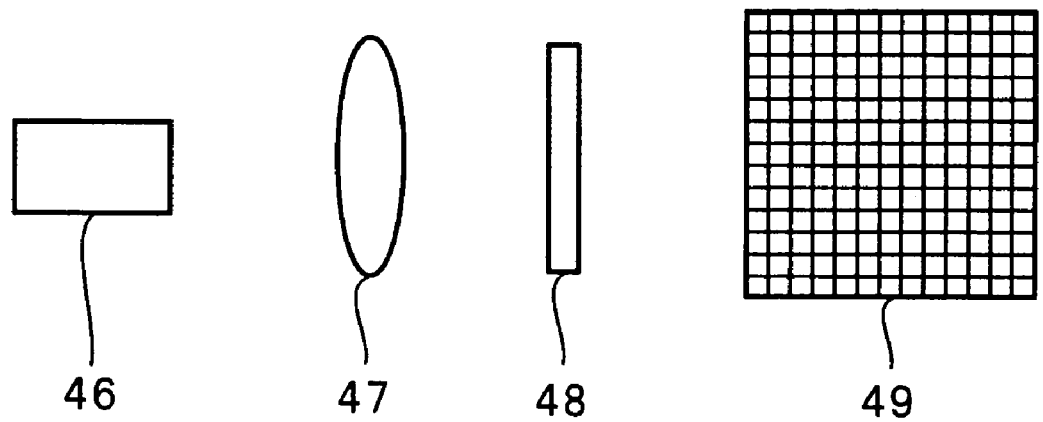
FIG. 26 is a view showing schematically a device for observing spherical aberration of a composite-type non-spherical lens.

Then, the resulting composite-type non-spherical lens and a spherical lens with no resin layer formed thereon were observed for spherical aberration using an apparatus shown in FIG. 26. A lens 47 was disposed between a screen 48 on which a mesh pattern was formed, and a CCD camera 46, and a mesh pattern on a screen 48 was observed by enlarging with a CCD camera 46. A mesh pattern on a screen 48 is a mesh pattern 49 having an interval of 0.5 nm as shown in FIG. 26.

Figure 27:
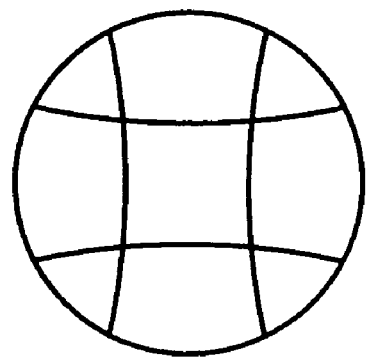
FIG. 27 is a view showing a mesh pattern image when observed using a glass spherical lens and a composite-type non-spherical lens.
Figure 27:
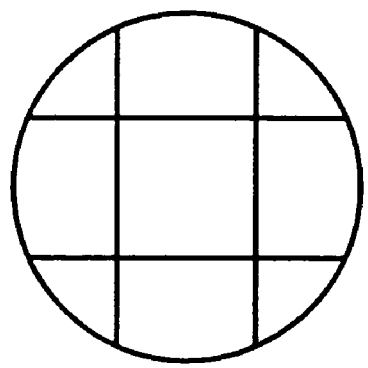

When a glass spherical lens 40 is used as a lens 47, an image of a distorted mesh pattern as shown in FIG. 27(b) was observed due to spherical aberration peculiar in a spherical lens. To the contrary, when a composite-type non-spherical lens 45 as prepared above was used as a lens 47, an image having a truly enlarged mesh pattern was obtained as shown in FIG. 27(a).

Also when a composite-type non-spherical lens was prepared as described above using each of viscous solutions obtained in other Examples (e.g. Example 15-12) other than Example 1, the similar result as described above was obtained.

As described above, the organometallic polymer material of the present invention has high heat resistance, and excellent transparency. By adding an organic or inorganic functional material to the organometallic polymer material of the present invention, functionality possessed by this functional material can be imparted.

What is claimed is:

1. An organometallic polymer material having a -M-OM- bond (M is a metal atom), containing:
    a metal alkoxide having only one hydrolyzable group and/or a hydrolysate of said metal alkoxide; and
    an organic acid anhydride and/or an organic acid,
    wherein said metal alkoxide or said hydrolysate is contained in the state where it is not bound to the organometallic polymer,
    each light propagation loss in wavelength ranges of 500 to 1100 nm, 1300 to 1350 nm and 1450 to 1550 nm is 15 dB/cm or smaller, and
    at least one kind of particle composed of a material having a refractive index different from that of said organometallic polymer is contained in said organometallic polymer.

2. The organometallic polymer material according to claim 1, wherein said organometallic polymer is synthesized by hydrolysis and polycondensation of an organometallic compound having at least two hydrolyzable groups.

3. The organometallic polymer material according to claim 2, wherein at least one kind of said organometallic compound has a functional group which is crosslinkable.

4. The organometallic polymer material according to claim 3, wherein said organometallic compound having a functional group has acryloxy group, methacryloxy group, styryl group, vinyl group or epoxy group as a functional group.

5. The organometallic polymer material according to claim 1, wherein at least one of a boiling point of said metal alkoxide or said hydrolysate is not higher than a thermal curing temperature of said organometallic polymer.

6. The organometallic polymer material according to claim 1, wherein at least one of said metal alkoxide and said hydrolysate contains a fluorine atom.

7. The organometallic polymer material according to claim 1, wherein at least one of said metal alkoxide and said hydrolysate is alkoxysilane represented by the following general formula or a hydrolysate thereof

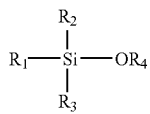

(wherein $R_1$, $R_2$ and $R_3$ denote an organic group having a carbon number of 1 to 15, and $R_4$ denotes an alkyl group having a carbon number 1 to 4).

8. The organometallic polymer material according to claim 1, wherein said organic acid anhydride is trifluoroacetic anhydride, and said organic acid is trifluoroacetic acid.

9. The organometallic polymer material according to claim 1, wherein M in said -M-O-M- bond in said organometallic polymer is Si, Ti, Nb or Zr.

10. The organometallic polymer material according to claim 1, wherein M in said -M-O-M- bond in said organometallic polymer is at least two kinds of Si, Ti, Nb and Zr.

11. The organometallic polymer material according to claim 1, wherein M in said -M-O-M- bond in said organometallic polymer is Si.

12. The organometallic polymer material according to claim 11, wherein an amount of silanol group (Si—OH) in said organometallic polymer is adjusted so that a ratio of (a height of an absorption peak of Si—OH bond around 3400 $cm^{-1}$)/(a height of an absorption peak of C—H bond around 2900 $cm_{-1}$) in an infrared absorption spectrum is 0.2 or smaller.

13. The organometallic polymer material according to claim 11, wherein said organometallic polymer is a silicone resin.

14. The organometallic polymer material according to claim 11, wherein said organometallic polymer is synthesized by hydrolysis and polycondensation of at least one kind of alkoxysilane.

15. The organometallic polymer material according to claim 14, wherein said at least one kind of alkoxysilane is alkoxysilane having acryloxy group, methacryloxy group, styryl group, vinyl group or epoxy group.

16. The organometallic polymer material according to claim 1, wherein said particle is at least one selected from silicon oxide, niobium oxide, zirconium oxide and titanium oxide.

17. An optical device manufactured by using an organometallic polymer material as recited in claim 1.

18. The optical device according to claim 17, which is a composite-type non-spherical lens.

19. An adhesive composition comprising an organometallic polymer material as recited in claim 1.

20. An optical device obtained by adhering a plural of optical devices using an adhesive composition as recited in claim 19.

21. A laminated structure formed on a substrate using an organometallic polymer material as recited in claim 1, wherein an amount of OH group bound to a metal atom M is larger on a substrate side, and is smaller on a surface side of the laminated structure.

\* \* \* \* \*